(12) United States Patent
Dudar et al.

(10) Patent No.: US 10,001,088 B2
(45) Date of Patent: *Jun. 19, 2018

(54) CONVECTION HEATING ASSISTED ENGINE-OFF NATURAL VACUUM TEST

(71) Applicant: Ford Global Technologies, LLC, Dearborn, MI (US)

(72) Inventors: Aed M. Dudar, Canton, MI (US); Niels Christopher Kragh, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/016,061

(22) Filed: Feb. 4, 2016

(65) Prior Publication Data
US 2017/0226967 A1    Aug. 10, 2017

(51) Int. Cl.
*G01M 3/04* (2006.01)
*F02M 25/08* (2006.01)

(52) U.S. Cl.
CPC .............................. *F02M 25/0818* (2013.01)

(58) Field of Classification Search
CPC ........... F02M 25/0818; F02M 25/0854; F02M 33/04; F02M 33/02; F02M 25/0809; F02M 25/08; F02D 41/0042; F02D 41/004; F02D 19/0642; G01N 3/12
See application file for complete search history.

(56) References Cited

U.S. PATENT DOCUMENTS

| | | | | |
|---|---|---|---|---|
| 3,311,106 A | * | 3/1967 | Baughman ............ | F24C 15/022 126/200 |
| 4,276,864 A | * | 7/1981 | Waschkuttis ........... | F02M 17/24 123/544 |
| 5,193,262 A | * | 3/1993 | Hyde ............... | B60K 15/03177 220/562 |
| 5,496,069 A | * | 3/1996 | Milligan ................ | B60K 15/03 252/62 |
| 5,732,666 A | * | 3/1998 | Lee ...................... | B60K 11/085 123/41.05 |

(Continued)

OTHER PUBLICATIONS

Dudar, Aed M., "Evaporative Emissions Testing Using Inductive Heating," U.S. Appl. No. 14/866,305, filed Sep. 25, 2015, 59 pages.

*Primary Examiner* — Manish S Shah
*Assistant Examiner* — Nigel Plumb
(74) *Attorney, Agent, or Firm* — Julia Voutyras; McCoy Russell LLP

(57) ABSTRACT

Methods and systems are provided for conducting an engine off natural vacuum test in a vehicle in order to indicate the presence or absence of undesired evaporative emissions. In one example, a vehicle fuel system and evaporative emissions system are sealed from atmosphere, and responsive to a pressure increase below an expected threshold, the fuel system and evaporative emissions system are actively pressurized via circulating hot engine coolant to a heater core and blowing hot air through the vehicle cabin to the fuel system via a three way ventilation valve in the rear of the vehicle. In this way, false failures of EONV test procedures due to environmental factors and vehicle operator drive habits may be reduced, and unnecessary engine service may be avoided.

20 Claims, 6 Drawing Sheets

(56) References Cited

U.S. PATENT DOCUMENTS

| | | | | |
|---|---|---|---|---|
| 6,082,337 | A * | 7/2000 | Fujimoto | F02M 25/0809 123/520 |
| 6,401,961 | B1 * | 6/2002 | Butler | B29C 49/20 220/560.01 |
| 7,007,856 | B2 * | 3/2006 | La Falce | B60H 1/322 165/41 |
| 7,559,391 | B2 * | 7/2009 | Bradley | B60K 11/085 180/68.1 |
| 8,161,919 | B2 * | 4/2012 | Klotz | B60K 11/085 123/41.04 |
| 8,251,039 | B2 * | 8/2012 | Speer | B60R 13/0876 123/195 C |
| 9,026,345 | B2 * | 5/2015 | Dudar | F02M 25/0818 701/113 |
| 9,086,040 | B2 * | 7/2015 | Jentz | F02M 37/0088 |
| 9,140,627 | B2 * | 9/2015 | Dudar | F02M 65/00 |
| 9,669,705 | B2 * | 6/2017 | Pearce | B60K 15/03504 |
| 2005/0011185 | A1 * | 1/2005 | Annoura | F02D 41/0032 60/289 |
| 2006/0053868 | A1 * | 3/2006 | Chung | B60K 6/44 73/49.7 |
| 2006/0060401 | A1 * | 3/2006 | Bole | B60K 11/085 180/68.1 |
| 2013/0297234 | A1 * | 11/2013 | Criel | G01M 3/26 702/51 |
| 2014/0297163 | A1 * | 10/2014 | Kragh | F02D 41/0002 701/108 |
| 2015/0046026 | A1 * | 2/2015 | Pearce | G07C 5/00 701/33.9 |
| 2017/0198662 | A1 * | 7/2017 | Dudar | F02M 25/0818 |
| 2017/0198671 | A1 * | 7/2017 | Dudar | F02M 25/089 |

\* cited by examiner

CONVECTION HEATING ASSISTED ENGINE-OFF NATURAL VACUUM TEST

FIELD

The present description relates generally to methods and systems for controlling a vehicle engine to actively increase pressure in a fuel system and evaporative emissions system for engine off natural vacuum emissions testing.

BACKGROUND/SUMMARY

Vehicle evaporative emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of undesired evaporative emissions that could release fuel vapors to the atmosphere.

Undesired evaporative emissions may be identified using engine-off natural vacuum (EONV) during conditions when a vehicle engine is not operating. In particular, a fuel system and evaporative emissions control system may be isolated at an engine-off event. The pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation is monitored and undesired emissions identified based on expected vacuum development or expected rates of vacuum development. The EONV test may be monitored for a period of time based on available battery charge.

However, the EONV test is prone to false failures based on customer driving and parking habits. For example, a refueling event that fills the fuel tank with relatively cool liquid fuel followed by a short ensuing trip may fail to heat the fuel bulk mass and may result in a false fail if an EONV test is run. Further, the rates of pressure build and vacuum development are based in part on the ambient temperature. During mild weather conditions, the ambient temperature may restrict the amount of heating or cooling of the fuel tank following engine shut-off, and thus limit the rate of pressure or vacuum development. As such, in a case wherein a pressure build does not reach the expected threshold, the subsequent vacuum build may additionally not reach expected threshold level in the time allotted for the EONV test based on available battery charge. This may result in a false-fail condition, leading to potentially unnecessary engine service.

US Patent Application US 20140074385 teaches during engine-off conditions, operating a fuel pump coupled to the fuel tank to initiate an evaporative emissions test. By operating the fuel pump, fuel in the fuel tank is agitated, causing a fuel vapor pressure to increase. Following the fuel tank pressure build-up, pump operation is discontinued, and a rate of pressure decay or bleed-down is monitored and compared to a threshold rate. However, the inventors have recognized a potential issue with such a method. For example, the method cannot be used to supplement a pressure rise during the course of an EONV test, due to confounding noise factors associated with the agitation of fuel by the fuel pump.

U.S. Pat. No. 9,140,627 teaches during a vacuum portion of an EONV test, operating a cooling fan to increase a fuel system vacuum, and indicating the presence or absence of undesired evaporative emissions based on the increased vacuum. However, the inventors have recognized a potential issue with such a method. For example, while the method may serve to facilitate an increased level of vacuum during the vacuum build portion of an EONV test, the portion of the EONV test wherein a pressure build is monitored is not able to be manipulated by such a method.

The inventors herein have recognized the above issues, and developed systems and methods to at least partially address the problems. In one example a method is provided, comprising during an engine-off condition and responsive to predetermined test conditions, sealing the fuel tank and the emission system from atmosphere, and routing engine heat through a passenger cabin of the vehicle to the fuel tank.

As one example, routing engine heat through a passenger cabin of the vehicle to the fuel tank comprises a pressure increase in the fuel tank and emission system below an expected threshold pressure level while the fuel tank and emission system are sealed, wherein the pressure increase is monitored, or inferred. In this way, responsive to an indication that a pressure increase in the fuel tank and emission system is below an expected threshold pressure level while the fuel tank and emission system are sealed, engine heat may be routed through the passenger cabin of the vehicle to the fuel tank, thereby increasing pressure in the fuel tank and emission system. By actively increasing pressure in the fuel tank and emission system, pressure in the fuel tank and emission system may reach the expected threshold pressure level, thus indicating an absence of undesired evaporative emissions under circumstances where undesired emissions are not present. By enabling the option to actively pressurize the fuel tank and emission system, reliance of the EONV test on environmental factors and vehicle operator driving habits may be reduced, thus increasing completion rates and reducing false-failures during evaporative emissions diagnostic tests.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
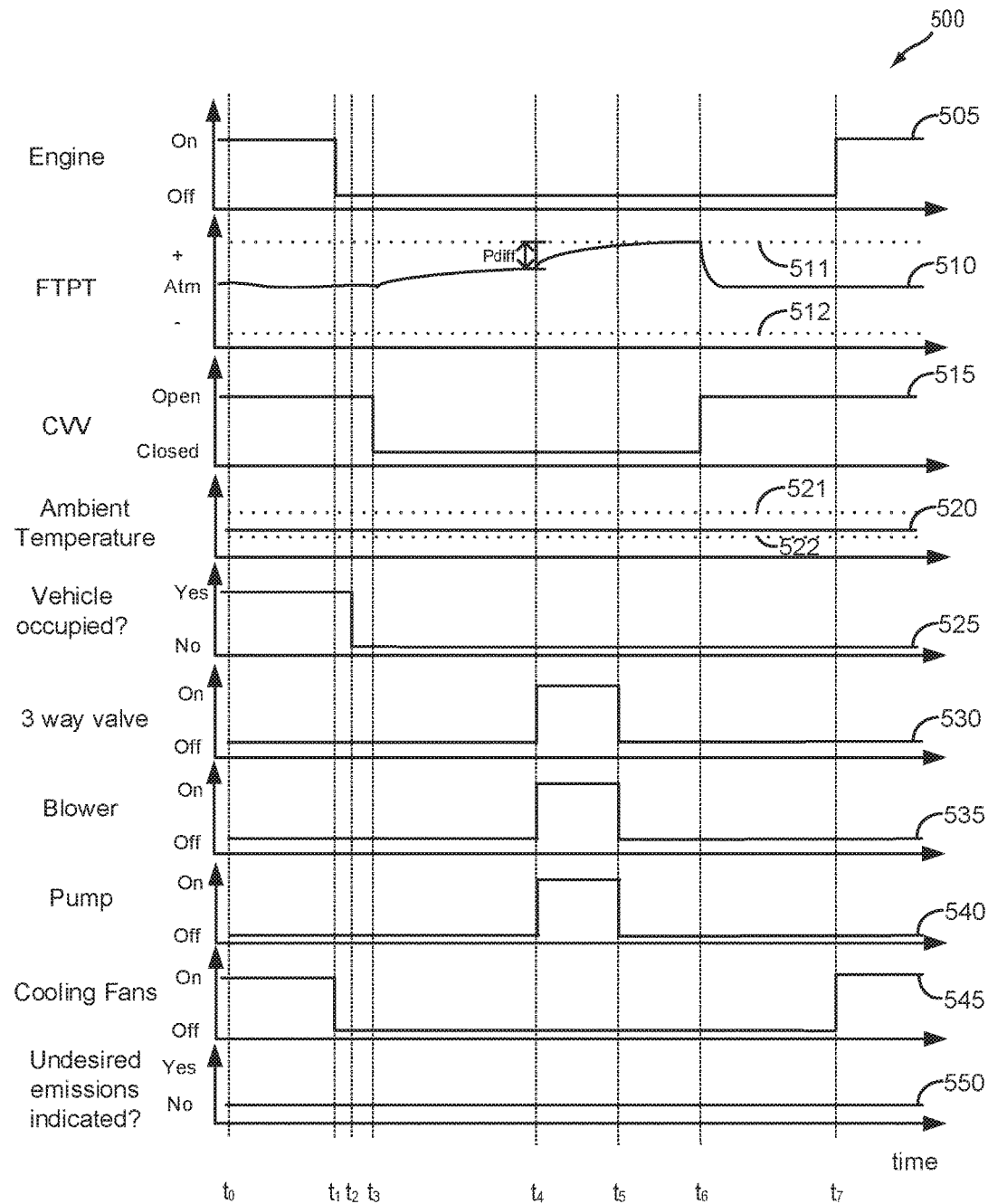
FIG. 5 shows an example timeline for actively pressurizing a fuel system and evaporative emissions system during an EONV test, according to the method depicted in FIG. 3.
Figure 6:
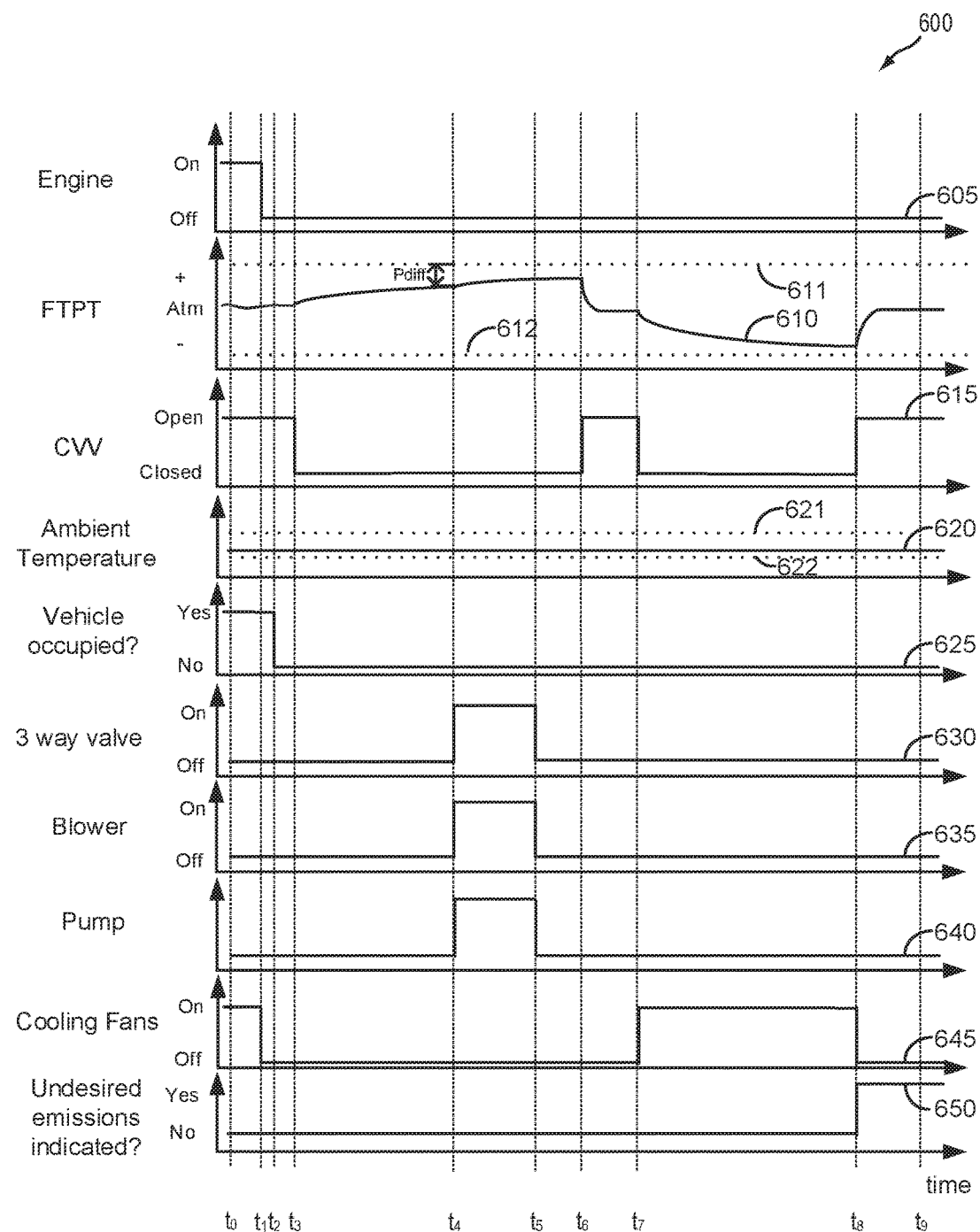
FIG. 6 shows an example timeline for actively pressurizing a fuel system and evaporative emissions system during an EONV test, and subsequently performing a vacuum-build portion of the EONV test, according to the methods depicted in FIGS. 3-4.

This detailed description relates to systems and methods for conducting an engine off natural vacuum (EONV) test in a vehicle to indicate the presence or absence of undesired evaporative emissions. Specifically, the description relates to actively heating the fuel system to increase pressure in the fuel system and evaporative emissions system such that robust results may be obtained from the EONV test procedure. Actively heating the fuel system may comprise activating an electric auxiliary pump to circulate hot engine coolant to a heater core during engine off conditions. A cabin blower may additionally be activated to direct hot air emanating from the heater core to the vehicle cabin. The heated air in the vehicle cabin may subsequently be routed to the fuel tank via configuring a three way ventilation valve in the rear of the vehicle to an ON position, thereby enabling heated air to be routed from the cabin to the fuel tank. The systems and methods may be applied to a vehicle system capable of circulating hot engine coolant to a heater core and heating the vehicle cabin during engine off conditions, such as the hybrid vehicle system depicted in FIG. 1. The EONV test procedure described herein may be used to assess the presence of absence of undesired emissions in a vehicle fuel system coupled to an evaporative emissions system, as depicted in FIG. 2. A method for actively pressurizing the fuel system and evaporative emissions system by routing heated air through the vehicle cabin to the fuel tank is illustrated in FIG. 3. If, during the pressure rise portion of the EONV test, active pressurization of the fuel system and evaporative emissions system does not result in the pressure reaching a pressure threshold, a vacuum-build portion of the EONV test may be conducted, according to the method depicted in FIG. 4. In some examples, to increase the development of fuel system and evaporative emissions system vacuum, engine cooling fans may be activated during the vacuum-build portion of the EONV test. A timeline for conducting an EONV test wherein the fuel system and evaporative emissions system are actively pressurized by routing heated cabin air to the fuel tank, is illustrated in FIG. 5. A timeline for an EONV test wherein a vacuum-build portion of the EONV test is conducted responsive to a pressure increase below a pressure threshold during the pressure rise portion of the EONV test, is illustrated in FIG. 6.

Figure 1:
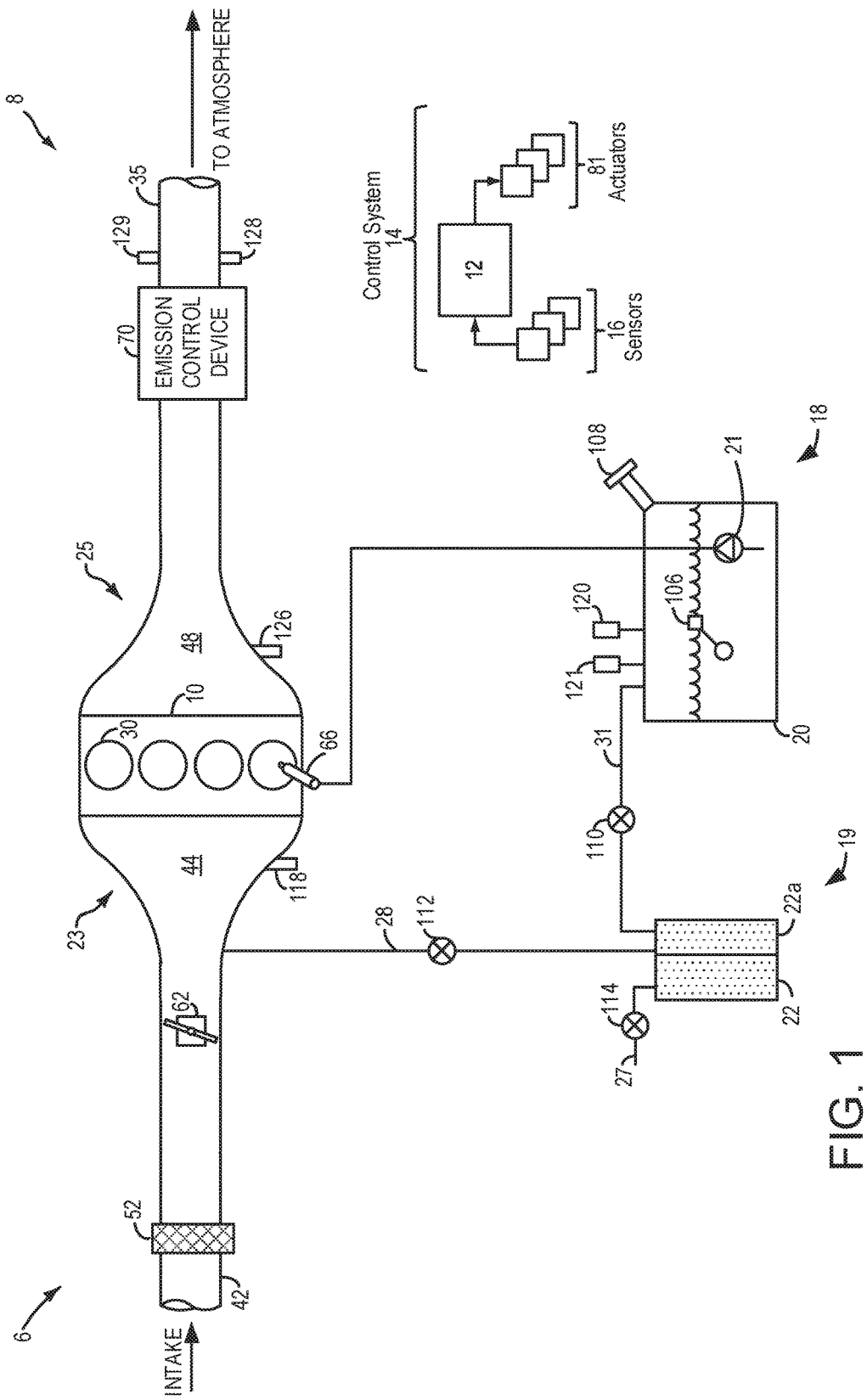
FIG. 1 shows a schematic depiction of a fuel system coupled to an engine system.
Figure 2:
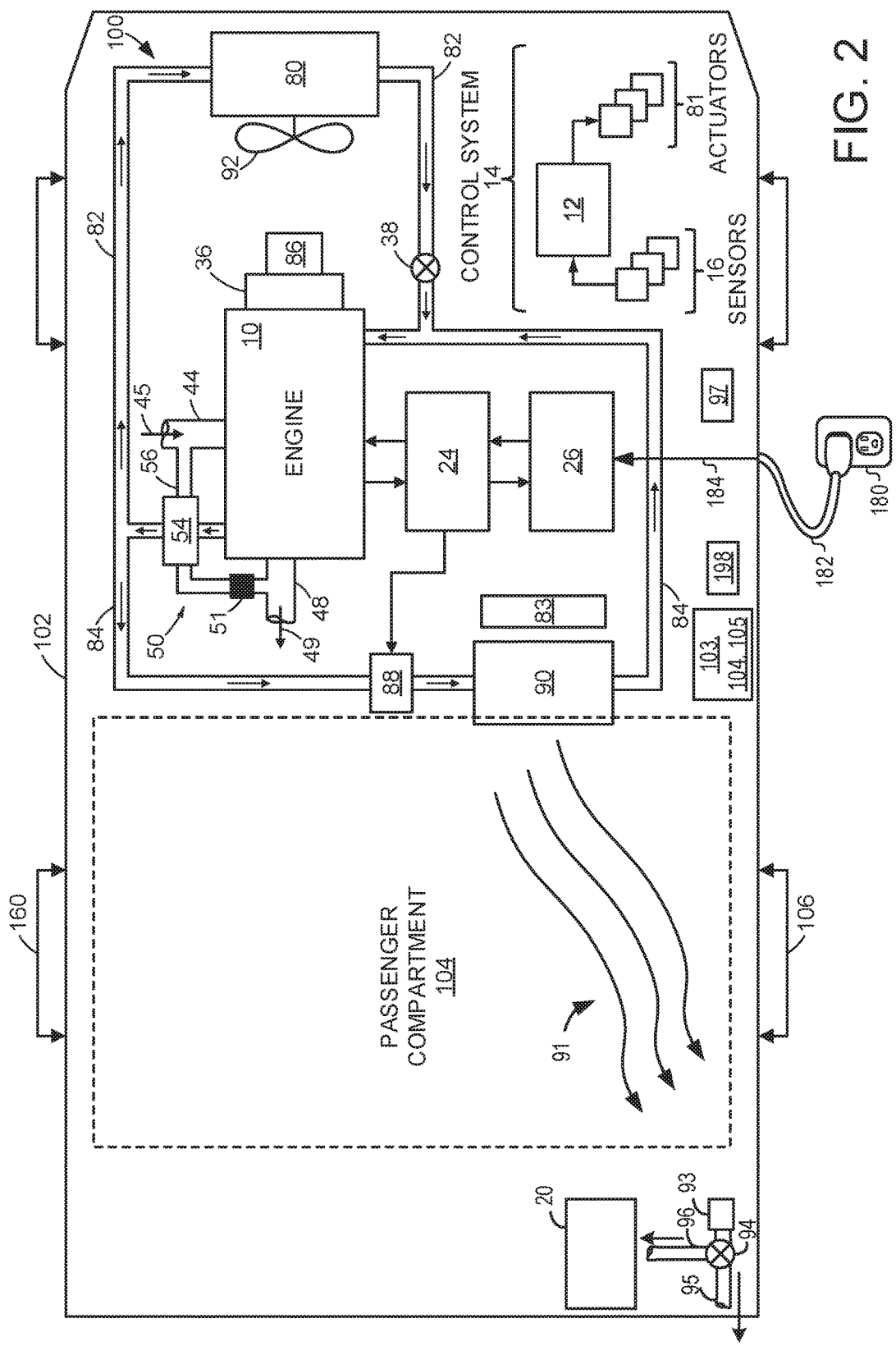
FIG. 2 shows a schematic depiction of a cooling system for a hybrid vehicle system.
Figure 3:
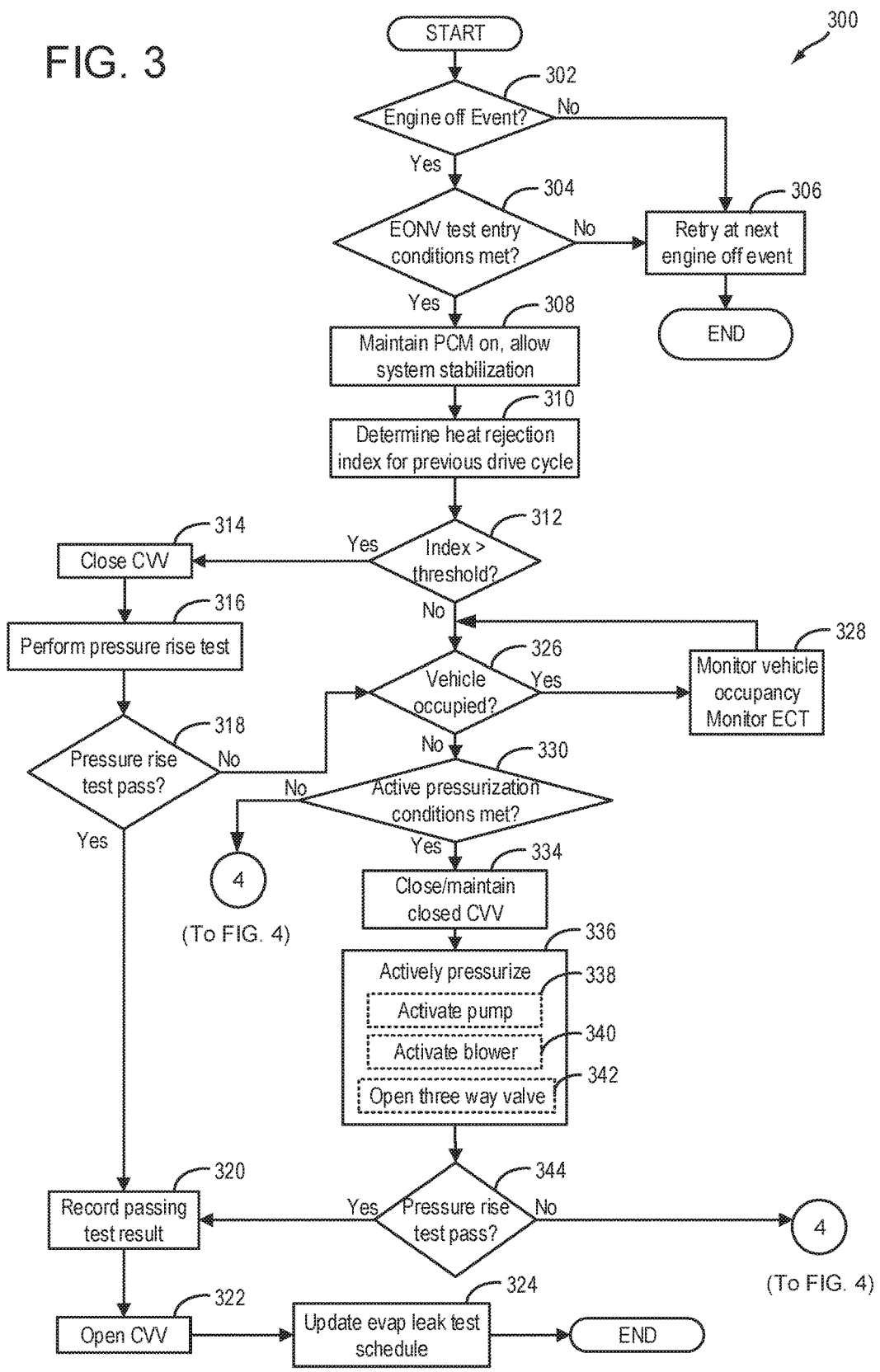
FIG. 3 shows a flowchart for a high level example method for actively pressurizing a fuel system and evaporative emissions system during an EONV test.

FIG. 1 shows a schematic depiction of a hybrid vehicle system 6 that can derive propulsion power from engine system 8 and/or an on-board energy storage device, such as a battery system (see FIG. 2 for a schematic depiction). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18, and evaporative emissions system 19. Fuel system 18 includes a fuel tank 20 coupled to a fuel pump 21, the fuel tank supplying fuel to an engine 10 which propels a vehicle. Evaporative emissions system 19 includes fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be in an open position that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system (and evaporative emissions system) pressure. In one example, the fuel system pressure, and in some example evaporative emissions system pressure as well, is indicated by pressure sensor 120, where pressure sensor 120 is a fuel tank pressure transducer (FTPT) coupled to fuel tank 20. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 and evaporative emissions system 19 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system and evaporative emissions system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before enabling fuel to be added therein. As such, isolation valve 110 may be kept open during the refueling operation to allow refueling vapors to be stored in the canister. After refueling is completed, the isolation valve may be closed.

As yet another example, the fuel system and evaporative emissions system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIG. 3 and FIG. 4.

Controller 12 may also be configured to intermittently perform evaporative emissions detection routines on fuel system 18 and evaporative emissions system 19 to confirm that the fuel system and/or evaporative emissions system is not degraded. As such, various diagnostic evaporative emissions detection tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum test (EONV). In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may monitored and undesired emissions identified based on expected vacuum development or expected rates of vacuum development. The EONV test may be monitored for a period of time based on available battery charge. However, as described above and which will be described in further detail below, in some examples the pressure rise in the fuel system and evaporative emissions system during an EONV test may plateau based on a multitude of noise factors, even if the fuel system and evaporative emissions system is free of undesired evaporative emissions. In such a case, actively pressurizing the fuel system an evaporative emissions system to enable a pressure build to a pressure threshold, provided that the fuel system and evaporative emissions system are free of undesired emissions. As will be described in detail below, actively pressurizing the fuel system and evaporative emissions system during engine off conditions may be accomplished by routing heated cabin air to the fuel tank to raise fuel tank temperature and thus increase fuel system and evaporative emissions system pressure. Routing of heated cabin air may comprise circulating hot engine coolant to a heater core of the vehicle, and activating a blower to direct heated air emanating from the heater core to the vehicle cabin. The heated air may then be directed to the fuel tank via an introduced three way ventilation valve at the rear of the vehicle, described in further detail below.

Turning now to FIG. 2, an example embodiment of a cooling system 100 in a motor vehicle 102 is illustrated schematically. Cooling system 100 circulates coolant through internal combustion engine 10 and exhaust gas recirculation (EGR) cooler 54 to absorb waste heat and distributes the heated coolant to radiator 80 and/or heater core 90 via coolant lines 82 and 84, respectively.

In particular, FIG. 2 shows cooling system 100 coupled to engine 10 and circulating engine coolant from engine 10, through EGR cooler 54, and to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 102 is moving slowly or stopped while the engine is running. In some examples, fan speed may be controlled by controller 12. Alternatively, fan 92 may be coupled to engine-driven water pump 86.

As shown in FIG. 2, engine 10 may include an exhaust gas recirculation (EGR) system 50. EGR system 50 may route a desired portion of exhaust gas from exhaust manifold 48 to intake manifold 44 via EGR passage 56. The amount of EGR provided to intake manifold 44 may be varied by controller 12 via EGR valve 51. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 54 for cooling exhaust gas 49 being reintroduced to engine 10. In such an embodiment, coolant leaving engine 10 may be circulated through EGR cooler 54 before moving through coolant line 82 to radiator 80.

After passing through EGR cooler 54, coolant may flow through coolant line 82, as described above, and/or through coolant line 84 to heater core 90 where the heat may be transferred to passenger compartment 104, and the coolant flows back to engine 10. Heat may be transferred to passenger compartment 104 by a cabin blower 83. In some examples, engine-driven pump 86 may operate to circulate the coolant through both coolant lines 82 and 84. In other examples, such as the example of FIG. 2 in which vehicle 102 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running, as will be described in further detail below. Like engine-driven pump 86, auxiliary pump 88 may be a centrifugal pump; however, the pressure (and resulting flow) produced by pump 88 may be proportional to an amount of power supplied to the pump by energy storage device 26.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 160, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 160. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

In some examples, energy storage device 26 may periodically receive electrical energy from a power source 180 residing external to the vehicle (e.g., not part of the vehicle) as indicated by arrow 184. As a non-limiting example, vehicle system 100 may be configured as a plug-in hybrid electric vehicle (PHEV), whereby electrical energy may be supplied to energy storage device 26 from power source 180 via an electrical energy transmission cable 182. During a recharging operation of energy storage device 26 from power source 180, electrical transmission cable 182 may electrically couple energy storage device 26 and power source 180. While the vehicle propulsion system is operated to propel the vehicle, electrical transmission cable 182 may be disconnected between power source 180 and energy storage device 26. Control system 14 may identify and/or control the amount of electrical energy stored at the energy storage device, which may be referred to as the state of charge (SOC). Power source 180 may comprise a part of an electrical grid.

In other embodiments, electrical transmission cable 182 may be omitted, where electrical energy may be received wirelessly at energy storage device 26 from power source 180. For example, energy storage device 26 may receive electrical energy from power source 180 via one or more of electromagnetic induction, radio waves, and electromagnetic resonance. As such, it should be appreciated that any suitable approach may be used for recharging energy storage device 26 from a power source that does not comprise part of the vehicle. In this way, a motor may propel the vehicle by utilizing an energy source other than the fuel utilized by engine 10.

The vehicle propulsion system 100 may also include an ambient temperature/humidity sensor 198, and sensors dedicated to indicating the occupancy-state of the vehicle, for example seat load cells 103, door sensing technology 104, and onboard cameras 105. Control system 14 may receive information from such sensors, based on vehicle operating conditions.

In some examples, vehicle propulsion system 100 may further include autonomous driving sensors 97 and an autonomous controller (e.g., 12) that receives signals generated by the autonomous driving sensors (e.g., sensors for driving the vehicle in an autonomous mode) and controls at least one vehicle subsystem to operate the vehicle in autonomous mode according to the signals received.

Vehicle propulsion system 100 may also include a ventilation duct 93 at the rear of the vehicle at a position near the fuel tank 20 (from FIG. 1). The ventilation duct 93 may be a passive duct configured with shutters that may open when pressure builds up inside the vehicle cabin (e.g., passenger compartment 104) from forced air flow. Forced air flow may comprise forced air resulting from the blower 83, forcing heated air emanating from heater core 90 into the vehicle cabin. Accordingly, air flow may travel through the vehicle cabin to the ventilation duct, illustrated by arrows 91. The ventilation duct may be coupled to a three way ventilation valve 94. The three way ventilation valve may be configured to direct heated cabin air to atmosphere via conduit 95 in one example, or to direct heated cabin air to the fuel tank 20 via conduit 96 in another example. When the three way ventilation valve is an in "ON" conformation, it may be understood that heated (or in other examples, cooled) cabin air may be routed to the fuel tank 20, and when in an "OFF" conformation, it may be understood that heated (or in other examples, cooled) cabin air may be routed to atmosphere. As described above and which will be described in further detail below, during the pressure-rise portion of an EONV test, if the pressure rise plateaus, the electric auxiliary pump 88 may be activated to circulate hot engine coolant to the heater core 90. The blower 83 may be further activated to direct hot air emanating from the heater core to the vehicle cabin, where it may be routed to the ventilation duct 93. By configuring three way ventilation valve 94 in an "ON" conformation, heated cabin air may be directed to the fuel tank 20. Accordingly, pressure in the fuel system and evaporative emissions system may build, and may reach a threshold pressure level under circumstances where there is an absence of undesired evaporative emissions in the fuel system and evaporative emissions system.

Turning now to FIG. 3, a flow chart for a high level example method 300 for conducting an evaporative emissions test diagnostic is shown. More specifically, method 300 may be used to actively pressurize a vehicle fuel system and evaporative emissions system responsive to an indication that heat rejected to the fuel system during a previous drive cycle was below a threshold, or responsive to a plateau in the pressure rise during an evaporative emissions test. In this way, evaporative emissions test diagnostics may be able to execute more frequently, and may be less prone to environmental factors that may contribute to false indications of undesired emissions. Method 300 will be described with reference to the systems described herein and shown in FIGS. 1-2, though it should be understood that similar methods may be applied to other systems without departing from the scope of this disclosure. Method 300 may be carried out by a controller, such as controller 12 in FIG. 1, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators such as the canister vent valve (e.g., 114), to fluidically couple the fuel vapor canister to atmosphere, the fuel tank isolation valve (e.g., 110), to fluidically couple the fuel vapor canister to the fuel tank, the three-way ventilation valve (e.g., 94), to fluidically couple the vehicle interior to either atmosphere or to the fuel tank, the blower (e.g., 83), to direct hot air from the heater core (e.g., 90) to the vehicle cabin, and the electric auxiliary pump (e.g., 88), for circulating hot engine coolant during engine off conditions, according to the methods described below.

Method 300 begins at 302 and includes determining whether a vehicle-off event has occurred. The vehicle-off event may include an engine-off event, and may be indicated by other events, such as a key-off event. The vehicle-off event may follow a vehicle run time duration, the vehicle run time duration commencing at a previous vehicle-on event. If no vehicle-off event is detected, method 300 may proceed to 306. At 306, method 300 includes recording that an EONV test was not executed, and further includes setting a flag to retry the EONV test at the next detected vehicle-off event. Method 300 may then end.

If at vehicle-off event is indicated at 302, method 300 may proceed to 304. At 304, method 300 includes indicating whether entry conditions for an EONV test are met. For an engine-off natural vacuum test, the engine must be at rest with all cylinders off, as opposed to engine operation with the engine rotating, even if one or more cylinders are deactivated. Further entry conditions may include a threshold amount of time passed since the previous EONV test, a threshold length of engine run time prior to the engine-off event, a threshold amount of fuel in the fuel tank, and a threshold battery state of charge. If entry conditions are not met, method 300 may proceed to 306. At 306, method 300 includes recording that an EONV test was not executed, and further includes setting a flag to retry the EONV test at the next detected vehicle-off event. Method 300 may then end.

Although entry conditions may be met at the initiation of method 300, conditions may change during the execution of the method. For example, an engine restart or refueling event may be sufficient to abort the method at any point prior to completing method 300. Another example may include a vehicle operator or other passenger occupying the vehicle during the execution of the method. If such events are detected that would interfere with the performing of method 300 or the interpretation of results derived from executing method 300, method 300 may proceed to 306, record that an EONV test was aborted, and set a flag to retry the EONV test at the next detected vehicle-off event, and then end.

If entry conditions are met, method 300 may proceed to 308. At 308, method 300 includes maintaining the PCM on despite the engine-off and/or vehicle off condition. In this way, the method may continue to be carried out by a controller, such as controller 12. At 308, method 300 further includes allowing the fuel system to stabilize following the engine-off condition. Allowing the fuel system to stabilize may include waiting for a period of time before method 300 advances. The stabilization period may be a pre-determined amount of time, or may be an amount of time based on current operating conditions. The stabilization period may be based on the current ambient conditions and/or the ambient conditions predicted for the test time period. In some examples, the stabilization period may be characterized as the length of time necessary for consecutive measurements of a parameter to be within a threshold of each other. For example, fuel may be returned to the fuel tank from other fuel system components following an engine off condition. The stabilization period may thus end when two or more consecutive fuel level measurements are within a threshold amount of each other, signifying that the fuel level in the fuel tank has reached a steady-state. In some examples, the stabilization period may end when the fuel tank pressure is equal to atmospheric pressure. Following the stabilization period, method 300 may then proceed to 310.

At 310, method 300 includes determining a heat rejection index (HRI) for the previous drive cycle. In some examples, the heat rejection index may be based on a drive cycle aggressiveness index. The drive cycle aggressiveness index may be based on an amount of heat rejected by the engine during the previous drive cycle, the timing of the heat rejected, the length of time spent at differing levels of drive aggressiveness, ambient conditions, etc. The heat rejected by the engine may be based on one or more of engine load, fuel injected summed over time, and/or intake manifold air mass summed over time, miles driven, etc. Following determining the heat rejection index at 310, method 300 may proceed to 312.

At 312, method 300 includes determining an HRI threshold. In one example, a 3D lookup table stored in the PCM may be used to adjust the HRI threshold based on the level of fuel in the fuel tank and the ambient temperature. The HRI threshold may thus represent a value for which an executed EONV leak test is likely to provide robust results. For example, based on the heat rejection index threshold, it may be inferred whether a pressure increase in the fuel system and evaporative emissions system would be below an expected pressure threshold level if the fuel system and evaporative emissions system were sealed following an engine-off event. For example, the HRI threshold may comprise an amount of air mass summation (lbs.) over a previous drive cycle, the air mass summation amount based on an indicated ambient temperature, and an indicated fuel level. As such, for a given ambient temperature (° F.), the HRI threshold may comprise a greater amount of air mass summation during a previous drive cycle for a fuel tank with a high fill level, and a lower amount of air mass summation for a fuel tank with a low fill level. Note that the above example of indicating an HRI threshold is one illustrative example, and is not meant to be limiting. For example, the HRI threshold may alternatively comprise a predetermined threshold, such as a number of miles driven, an amount of fuel injected summed over time, air mass summation over time, etc. Additionally or alternatively, any combination of engine load, fuel injected summed over time, air mass summation, miles driven, fuel level, ambient temp., etc., that may indicate an amount of heat rejected to the engine over time, may be utilized to determine the HRI threshold. Accordingly, at 312, method 300 includes indicating whether the HRI is greater than or equal to the threshold value. If the HRI is not greater than or equal to the threshold, method 300 may proceed to 326, and will be described in further detail below. Alternatively, if the HRI is indicated to be greater than or equal to the threshold, method 300 may proceed to 314.

At 314, method 300 includes closing a canister vent valve (e.g., 114). If included, a fuel tank isolation valve may be opened or maintained open, to fluidically couple the fuel system and the evaporative emissions system. In alternate examples, the fuel tank isolation valve may be commanded closed or maintained closed. For example, by commanding or maintaining closed the fuel tank isolation valve, the fuel system may be independently assessed for undesired evaporative emissions. As such, sealing the fuel tank via the fuel tank isolation valve may enable an indication of undesired evaporative emissions in the fuel tank independently of the emissions system, while closing the canister vent valve while maintaining open the fuel tank isolation valve may enable an indication of undesired evaporative emissions in the coupled fuel system and evaporative emissions system. In this way, it may be possible to isolate a location of undesired evaporative emissions, by conducting evaporative emissions test diagnostics under conditions wherein the fuel tank isolation valve is maintained opened, or closed. However, the example described above is meant to be illustrative, and in no way limiting. As such, it may be understood that in the example method 300 illustrated herein, it is assumed that the EONV test is performed on the fuel system and evaporative emissions system together, by closing the canister vent valve while maintaining or commanding open the fuel tank isolation valve, if included. Furthermore, the status of a canister purge valve (CPV) and/or other valves coupled within a conduit connecting the fuel tank to atmosphere may also be assessed and closed if open. Method 300 may then proceed to 316.

At 316, method 300 includes performing a pressure rise portion of an EONV evaporative emissions test diagnostic. While the engine is still cooling down post shut-down, there may be additional heat rejected to the fuel tank. With the fuel system and evaporative emissions system sealed via the closing of the CVV, the pressure in the fuel system and evaporative emissions system may rise due to fuel volatizing with increased temperature. The pressure rise test may include monitoring pressure via a pressure sensor (e.g., 120) for a period of time. Fuel tank pressure may be monitored until the pressure reaches a threshold, the threshold pressure indicative of no undesired evaporative emissions above a threshold size in the fuel system and/or evaporative emissions system. In some examples, a rate of pressure change may be compared to an expected rate of pressure change, wherein a rate of pressure change within a threshold amount of the expected pressure change rate is indicative of an absence of undesired evaporative emissions. The fuel tank pressure may not reach the threshold pressure. As such, pressure in the fuel system and evaporative emissions system may be monitored until consecutive measurements are within a threshold amount of each other (e.g., pressure plateau), or until a pressure measurement is less than the previous pressure measurement. In some examples, pressure may be monitored until the fuel tank temperature, as monitored by a fuel tank temperature sensor (e.g. 121) stabilizes. Method 300 may then proceed to 318.

At 318, method 300 includes indicating whether the pressure increase in the fuel system and evaporative emissions system reached the pressure threshold. If the pressure rise portion of the evaporative emissions test resulting in a passing result, method 300 may proceed to 320. At 320, method 300 includes indicating the passing test result. Indicating the passing result may include recording the successful outcome of the evaporative emissions test at the controller. Continuing at 322, method 300 includes unsealing the fuel system and evaporative emissions system by opening the canister vent valve. In this way, the fuel system and evaporative emissions system pressure may be returned to atmospheric pressure. Continuing at 324, method 300 includes updating the evaporative emissions test schedule. For example, scheduled evaporative emissions tests may be delayed or adjusted based on the passing test result. Method 300 may then end.

Returning to 318, if it is indicated that the pressure rise in the evaporative emissions system did not reach or exceed the pressure threshold, method 300 may proceed to 326. At 326, method includes indicating whether the vehicle is occupied. For example, at 326, seat load cells (e.g., 103), door sensing technology (e.g., 104), and/or onboard cameras (e.g., 105) may be utilized to indicate whether the vehicle is occupied. If, at 326 it is indicated that the vehicle is occupied, method 300 may proceed to 328. At 328, method 300 includes monitoring vehicle occupancy. For example, seat load cells, door sensing technology, and/or onboard cameras may be used as described above to indicate whether the vehicle continues to be occupied. Monitoring may include continuous monitoring, or may include monitoring the vehicle occupancy at preselected intervals.

At 326, if it is indicated that the vehicle is not occupied, method 300 may proceed to 330. At 330, method 300 includes indicating whether entry conditions for active pressurization of the fuel system and evaporative emissions system are met. In one example, at 330 method 300 may include indicating whether engine coolant temperature is above a threshold. Indicating engine coolant temperature may include indicating engine coolant temperature by any manner known in the art. The threshold engine coolant temperature may comprise an engine coolant temperature that may enable the vehicle cabin to be heated to a predetermined temperature during engine-off conditions, via circulating hot engine coolant to a heater core of the vehicle, and activating a vehicle cabin blower to transfer heater core heat to the cabin. The predetermined cabin temperature may comprise a temperature for which a predetermined amount of heat may be subsequently transferred from the vehicle cabin toward the fuel tank through a ventilation valve in the rear of the vehicle, as described above, and which will be described in further detail below. As such, the threshold engine coolant temperature threshold may be understood to comprise a coolant temperature for which a predetermined amount of heat may be transferred to the vehicle cabin, and further transferred to the fuel tank to increase pressure in the fuel system and evaporative emissions system by an expected amount.

In some examples, the engine coolant temperature threshold may additionally or alternatively be based on a difference between the pressure threshold for indicating an absence of undesired evaporative emissions, and the indicated pressure achieved during the pressure rise portion of the EONV test at 316 of method 300. For example, the threshold engine coolant temperature may be lowered responsive to an indicated pressure difference between the pressure threshold and the measured pressure below a threshold difference. In other words, if the difference between the pressure threshold and the measured pressure rise is small, the threshold engine coolant temperature may be lowered as less heat may be needed to increase the pressure in the fuel system to the threshold pressure. In other examples, the threshold engine coolant temperature may be raised responsive to an indicated pressure difference between the pressure threshold and the measured pressure difference above a threshold difference. In other words, if the difference between the pressure threshold and the measured pressure rise is large, the threshold engine coolant temperature may be raised as more heat may be needed to increase pressure in the fuel system.

In still other examples, the threshold engine coolant temperature may additionally or alternatively be based on ambient temperature. For example, at colder ambient temperatures, more heat may be needed to increase pressure in the fuel system a desired amount. Similarly, at hotter ambient temperatures, less heat may be needed to increase pressure in the fuel system a desired amount. As such, threshold engine coolant temperature may be further adjusted based on ambient temperature measurements.

At 330, indicating whether entry conditions for active pressurization of the fuel system and evaporative emissions system are met may further include indicating whether all of the windows in the vehicle are closed, and whether all of the doors are closed. For example, open windows or doors in the vehicle may render method 300 ineffective as heat transferred to the vehicle cabin may escape to atmosphere via open windows or doors.

Figure 4:
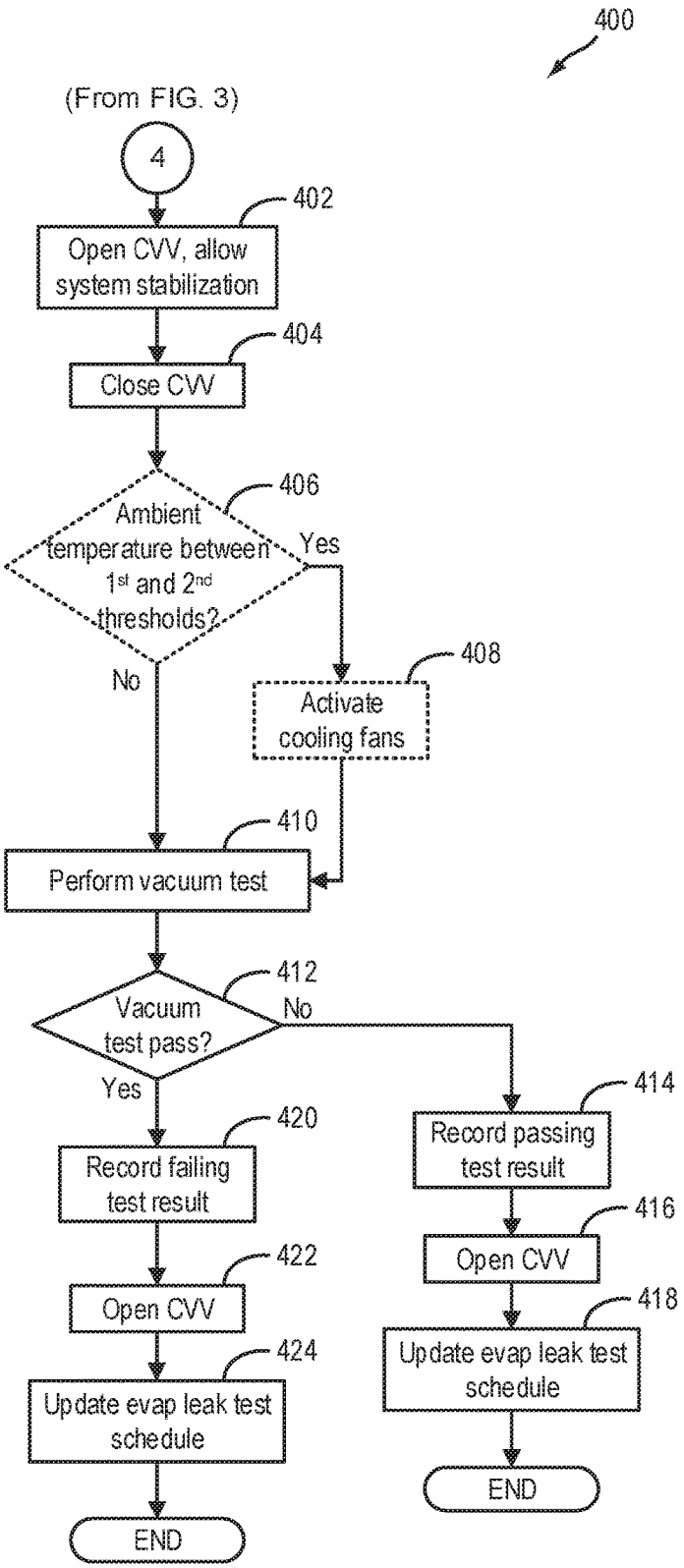
FIG. 4 shows a flowchart for a high level example method for conducting a vacuum build portion of an EONV test, continuing from the method depicted in FIG. 3.

Accordingly, at 330, if it is indicated that entry conditions for active pressurization of the fuel system and evaporative emissions system are not met, method 300 may proceed to FIG. 4, where method 400 may be used to conduct a vacuum build portion of the EONV test. More specifically, as the pressure rise did not meet the pressure threshold for the pressure rise portion of the EONV test, and conditions for active pressurization of the fuel system and evaporative emissions system were not met, the system may yet be tested for the presence or absence of undesired evaporative emissions based on a vacuum build as described by the method illustrated in FIG. 4.

If, at 330, entry conditions for active pressurization of the fuel system and evaporative emissions system are indicated to be met, method 300 may proceed to 334. At 334, method 300 includes maintaining closed the canister vent valve. More specifically, as the pressure rise was not indicated to reach the threshold pressure level, the fuel system and evaporative emissions system may remain sealed by maintaining the canister vent valve closed in order to conduct the active pressurization of the fuel system and evaporative emissions system.

Proceeding to 336, method 300 includes actively pressurizing the fuel system and evaporative emissions system. Actively pressurizing the fuel system and evaporative emissions system at 336 may comprise activating an electric auxiliary pump (e.g., 88) to circulate coolant through a heater core (e.g., 90) at 338. As described above, auxiliary pump may be a centrifugal pump, however the pressure (and resulting flow) produced by the pump may be proportional to an amount of power supplied to the pump by an energy storage device (e.g., 26). With hot engine coolant circulating through the heater core, a cabin blower may be activated at 340 to direct hot air emanating from the heater core to the vehicle cabin. Furthermore, at 342 a three way ventilation valve (e.g., 94) at the rear of the vehicle may be commanded to an on position (a first open conformation), the on position directing heated air from the vehicle cabin to an air space in close proximity to the fuel tank in order to actively heat the fuel tank.

At 336, the amount of heated cabin air routed to the fuel system may be based on a number of factors. In one example, the amount of heated air routed to the fuel system may be based on an indicated difference between a pressure threshold and the indicated pressure level achieved during the initial pressure rise portion of the EONV test. In such an example, the pressure threshold may include a threshold pressure level expected if there are no undesired evaporative emissions in the fuel system and/or evaporative emissions system, or if any undesired emissions are below a threshold level. More specifically, it may be determined what amount of heat to route to the fuel system such that pressure in the fuel system and evaporative emissions system may increase to the pressure threshold, provided that there are no undesired evaporative emissions in the fuel system and/or evaporative emissions system, or that any undesired evaporative emissions are below a threshold level. The amount of heated cabin air routed to the fuel system may be further based on engine coolant temperature. For example, the amount of time the engine coolant is circulated to the heater core and that the blower remains on may be increased if the engine coolant temperature is lower, and decreased if the engine coolant temperature is higher. The determined amount of heat may in some examples be based on an indicated level of fuel in the tank. For example, the level of fuel in the tank may affect the amount of heat needed to achieve an expected pressure level, and as such, the amount of heat routed to the fuel tank may adjusted based on an indication of fuel level. In some examples, the determined amount of heat routed to the fuel system may comprise activating the electric auxiliary pump and cabin blowers for a determined amount of time, while maintaining on the three way ventilation valve. In some examples, the determined amount of heat routed to the fuel system, and determined amount of time to route heat to the fuel system may be further based on ambient temperature. For example, lower ambient temperatures may necessitate greater amounts of heat transferred to the fuel system in order to achieve an expected pressure increase in the fuel system and evaporative emissions system. Some examples may additionally or alternatively include monitoring fuel tank temperature via a temperature in the fuel tank, wherein the fuel system may be heated until the temperature in the fuel tank reaches a predetermined temperature. In such an example, the predetermined temperature may comprise a temperature expected to increase pressure in the fuel system and evaporative emissions system a predicted amount, and may be further based on fuel level, and ambient temperature.

Proceeding to 344, following actively pressurizing the fuel system and evaporative emissions system at 336, method 300 includes indicating whether the pressure increase in the fuel system and evaporative emissions system reached the pressure threshold. If actively pressurizing the fuel system resulted in a passing result, method 300 may proceed to 320. At 320, method 300 includes indicating the passing test result. Indicating the passing result may include recording the successful outcome of the evaporative emissions test at the controller. Continuing at 322, method 300 includes opening the canister vent valve. In this way, the fuel system and evaporative emissions system pressure may be returned to atmospheric pressure. Continuing at 324, method 300 includes updating the evaporative emissions test schedule. For example, scheduled evaporative emissions tests may be delayed or adjusted based on the passing test result. Method 300 may then end. Alternatively, if actively pressurizing the fuel system did not result in pressure in the fuel system and evaporative emissions system reaching the pressure threshold, method 300 may proceed to FIG. 4, wherein a vacuum build in the fuel system and evaporative emissions system may be monitored to indicate the presence or absence of undesired emissions.

Returning to 312, if it is indicated that the HRI is not greater than or equal to the HRI threshold, method 300 may proceed to 326. In such an example circumstance, it may be understood that the amount of heat rejected to the fuel system during a previous drive cycle may be low, and may result in a pressure increase below a threshold pressure level even in the absence of undesired evaporative emissions. As such, a false-failure may be indicated if an EONV test is run without active pressurization of the fuel system. Accordingly, if the HRI is indicated to be below the HRI threshold, method 300 may proceed directly with actively pressurizing the fuel system to raise pressure in the fuel system and evaporative emissions system such that robust results may be obtained from an EONV test. As all of the rest of the steps for actively pressurizing the fuel system and evaporative emissions system have been described in detail above, in an effort to avoid redundancy, the steps will not be reiterated in full detail here. However, it should be understood that all of the details described above with regard to method 300 apply to the steps following an indication that the HRI is below the HRI threshold. Briefly, responsive to an indication that the HRI is below the HRI threshold, if the vehicle is not occupied and entry conditions for actively pressurizing the fuel system and evaporative emissions system are met, the canister vent valve may be maintained closed and the fuel system and evaporative emissions system pressurized. Pressurization may be conducted via circulating hot engine coolant to a heater core, and blowing hot air emanating from the heater core to the vehicle cabin. Heated air in the vehicle cabin may subsequently be routed to the fuel tank, via configuring a three way ventilation valve in an ON state, thus directing heated air to the fuel tank. If actively pressurizing the fuel system and evaporative emissions system results in a pressure build to a threshold pressure level, an absence of undesired evaporative emissions may be indicated. Alternatively, if pressure does not build to the threshold pressure level, the method may proceed to FIG. 4, wherein a vacuum portion of the EONV test may be conducted. Furthermore, in the case that entry conditions for the active pressurization of the fuel system and evaporative emission system are not met, method 300 may additionally proceed to FIG. 4, such that the vacuum portion of the EONV test may be used to assess whether undesired evaporative emissions are present in the fuel system and/or evaporative emissions system.

Turning now to FIG. 4, a flow chart for a high level example method 400 for conducting a vacuum-portion of an EONV test is shown. More specifically, method 400 may continue from method 300 illustrated in FIG. 3, and may be used to indicate the presence or absence of undesired evaporative emissions by monitoring a vacuum build in a vehicle fuel system and evaporative emissions system. In this way, responsive to a pressure rise during the pressure rise portion of an EONV test not reaching a threshold pressure level, and wherein actively pressurizing the fuel system and evaporative emissions system did not result in the pressure reaching the threshold, monitoring vacuum build may indicate whether undesired evaporative emissions are present. Method 400 will be described with reference to the systems described herein and shown in FIGS. 1-2, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators such as the canister vent valve (e.g., 114), to fluidically couple the fuel vapor canister to atmosphere, the fuel tank isolation valve (e.g., 110), to fluidically couple the fuel vapor canister to the fuel tank, and engine cooling fans according to the methods described below.

Method 400 begins at 402 and includes opening the canister vent valve and allowing the system to stabilize. Opening the CVV may allow the fuel tank pressure to return to atmospheric pressure. In an example where the fuel system comprises a fuel tank isolation valve that was maintained open during the pressure rise portion of the EONV test illustrated in FIG. 3, the fuel tank isolation valve may be maintained open. The system may be allowed to stabilize until the fuel tank pressure reaches atmospheric pressure, or until consecutive pressure readings are within a threshold of each other. Method 400 may then proceed to 404.

At 404, method 400 may include closing the canister vent valve. In this way, the fuel system and evaporative emissions system may be isolated from atmosphere, as described above. As the fuel tank cools, the fuel vapors may condense into liquid fuel, creating a vacuum within the sealed tank. Continuing at 406, method 400 may include assessing the ambient (external) temperature, and determining whether the ambient temperature is between a first temperature threshold and a second temperature threshold. The first temperature threshold may be a higher temperature threshold, and may be indicative of ambient conditions likely to produce a passing result on a pressure rise test. The second temperature threshold may be a lower temperature threshold, and may be indicative of ambient conditions likely to produce a passing result on a vacuum test. Temperatures between the first and second temperature thresholds may be indicative of ambient conditions likely to produce failing results on both pressure rise and vacuum test, for example mild temperature conditions where a vacuum may not develop within the time allotted for an EONV test (e.g., 45 minutes).

If the ambient temperature does not fall between the first and second temperature thresholds, method 400 may proceed to 410. If the ambient temperature falls between the first and second temperature thresholds, method 400 may proceed to 408. At 408, method 400 may include activating engine cooling fans. In this way, the temperature of the fuel tank can be decreased faster than it would in the ambient conditions, thereby decreasing the chance of a false-fail result. In some embodiments, the fuel tank may be cooled in other ways, such as by circulating coolant through a cooling jacket coupled to the fuel tank. However, it should be understood that indicating whether ambient temperature is between the first and the second temperature threshold at 406 and activating engine cooling fans at 408, or circulating coolant through a cooling jacket coupled to the fuel tank, may not necessarily be integral to method 400. In other words, in some examples, method 400 may seal the canister vent valve at 404, and may proceed directly to 410. As such, FIG. 4 shows 406 and 408 as dashed blocks.

Continuing at 410, method 400 may include performing a vacuum test. Performing a vacuum test may include monitoring pressure in the fuel system and evaporative emissions system for a period of time. Pressure may be monitored until the vacuum reaches a threshold, the threshold vacuum indicative of no undesired emissions above a threshold size in the fuel system and/or evaporative emissions system. The threshold vacuum may be based on the current conditions, including the ambient temperature, the fuel level, the fuel volatility, etc. In some examples, the rate of pressure change may be compared to an expected rate of pressure change. In such an example, a rate of pressure change within a threshold of an expected pressure change may be indicative of an absence of undesired evaporative emissions. In some examples, the pressure in the fuel system and evaporative emissions system may not reach the threshold vacuum. Rather, the pressure may be monitored for a predetermined amount of time, or an amount of time based on the current conditions.

Continuing at 412, method 400 may include determining whether a passing result was indicated for the vacuum test, such as the vacuum in the fuel system and evaporative emission system reaching a threshold vacuum. If the vacuum test resulted in a passing result, method 400 may proceed to 414. At 414, method 400 may include recording the passing test result. Continuing at 416, method 400 may include opening the canister vent valve. If the cooling fans were turned on to assist fuel tank vacuum development, they may be shut off. In this way, pressure in the fuel system and evaporative emissions system may be returned to atmospheric pressure. Continuing at 418, method 400 may include updating the evaporative emissions test schedule. For example, scheduled evaporative emissions tests may be delayed or adjusted based on the passing test result. Method 400 may then end.

Alternatively, if the vacuum test did not result in a passing result, method 400 may proceed to 420. At 420, method 400 may include recording the presence of undesired evaporative emissions. Continuing at 422, method 400 may include opening the canister vent valve. In this way, pressure in the fuel system and evaporative emissions system may be returned to atmospheric pressure. If the cooling fans were turned on to assist vacuum development, they may be shut off. Proceeding to 424, method 400 may include updating the evaporative emissions test schedule. For example, as undesired evaporative emissions were indicated, scheduled evaporative emissions tests may be delayed, adjusted, or postponed until it is indicated that the source of undesired evaporative emissions has been mitigated. Method 400 may then end.

FIG. 5 shows an example timeline 500 for conducting an EONV test using active pressurization of the fuel system and evaporative emissions system, according to the methods described herein and with reference to FIGS. 3-4, and as applied to the systems described herein and with reference to FIGS. 1-2. Timeline 500 includes plot 505, indicating the on or off status of a vehicle engine, over time. Timeline 500 further includes plot 510, indicating pressure of a vehicle fuel system and evaporative emissions system, as monitored by a fuel tank pressure transducer (e.g., 120), over time. Line 511 represents a first threshold pressure level, wherein a pressure build in the fuel system and evaporative emissions system to the first threshold indicates an absence of undesired evaporative emissions. Line 512 represents a second threshold pressure level, wherein a vacuum build in the fuel system and evaporative emissions system to the second threshold indicates an absence of undesired evaporative emissions. Timeline 500 further includes plot 515, indicating an open or closed status of a canister vent valve (e.g., 114), over time. Timeline 500 further includes plot 520, indicating ambient temperature, over time. Line 521 represents a first threshold ambient temperature indicative of a temperature likely to result in a pressure build to the first threshold pressure level in the absence of undesired evaporative emissions. Line 522 represents a second threshold ambient temperature indicative of a temperature likely to result in a vacuum build to the second threshold pressure level in the absence of undesired evaporative emissions. Timeline 500 further includes plot 525, indicating whether the vehicle is occupied, over time. Timeline 500 further includes plot 530, indicating the on or off state of a three-way ventilation valve, over time. More specifically, an on state of the three way ventilation valve may refer to a position of the three way ventilation valve, wherein vehicle cabin air is routed to a position near a vehicle fuel tank, and an off state of the three way ventilation valve may refer to a position of the three way ventilation valve wherein vehicle cabin air is routed to atmosphere, away from the vehicle fuel tank. Timeline 500 further includes plot 535, indicating an on or off status of a blower configured to blow hot air emanating from a heater core of the vehicle to the vehicle cabin, over time. Timeline 500 further includes plot 540, indicating an on or off status of an electric auxiliary pump configured to circulate engine coolant through the cooling system during engine-off conditions, over time. Timeline 500 further includes plot 545, indicating the on or off status of engine cooling fans, over time. Timeline 500 further includes plot 550, indicating whether undesired evaporative emissions are indicated, over time.

At time $t_0$, the engine is on, indicated by plot 505. Accordingly, engine cooling fans are on, indicated by plot 545, and the canister vent valve is open, indicated by plot 515. Ambient temperature, indicated by plot 520, is between a first ambient temperature threshold, represented by line 521, and a second ambient temperature threshold, represented by line 522. The vehicle is occupied, indicated by plot 525. Cabin heat is not requested, and as such the blower configured to blow hot air emanating from a heater core is not on, indicated by plot 535. As the engine is on, electric auxiliary pump is off, as engine coolant is circulated via the engine-driven water pump, and the three way ventilation valve is off, thus diverting cabin air to atmosphere. Fuel system and evaporative emissions system pressure, as monitored by the fuel tank pressure transducer (FTPT) is near atmospheric pressure, as the canister vent valve is open. In this example, it may be understood that, if equipped, the fuel tank isolation valve is in an open conformation while the engine is operating, thus directing running loss fuel tank vapors to the fuel vapor canister. However, it should be understood that in some examples, particularly with regard to plug-in hybrid vehicles, the fuel tank isolation valve may be closed during engine-operation, thus sealing the fuel tank. In such an example, pressure in the fuel system as monitored by the FTPT may not be near atmospheric pressure. However, in this example, it may be understood that, if equipped, the fuel tank isolation valve is open. Finally, as the engine is in operation, an EONV test is not underway, and it may be understood that no prior EONV test diagnostics have indicated the presence of undesired evaporative emissions, indicated by plot 550.

At time $t_1$, the engine is turned off. Additionally, it may be understood that in this example, the engine-off event comprises a key-off event. Accordingly, the engine cooling fans are additionally turned off. As a vehicle-off event is indicated, it may be indicated whether entry conditions are met for an EONV test. For example, as described above, entry conditions may include the engine at rest with all cylinders off, a threshold amount of time passed since the previous EONV test, a threshold length of engine run time prior to the engine-off event, a threshold amount of fuel in the tank, a threshold battery state of charge, etc. In this example illustration, it may be assumed that entry conditions for an EONV test are indicated to be met. As such, the PCM may be maintained on, and the fuel system may be allowed to stabilize, as described above. At time $t_2$, it is indicated that the vehicle has become unoccupied. As described above, vehicle occupancy status may be indicated by, seat load cells (e.g., 103), door sensing technology (e.g., 104), and/or onboard cameras (e.g., 105). Between time $t_1$ and $t_3$, the fuel system stabilization is completed. Additionally, between time $t_1$ and $t_3$, a heat rejection index (HRI) may be determined for the previous drive cycle, as described in detail above with regard to the method illustrated in FIG. 3. Briefly, the heat rejection index may be based on a drive cycle aggressiveness index, comprising an amount of heat rejected by the engine during the previous drive cycle, the timing of heat rejected, the length of time spent at differing levels of drive aggressiveness, ambient conditions, etc. Heat rejected may further be based on one or more of engine load, fuel injection summed over time, intake manifold air mass summed over time, miles driven, etc.

Following determining the HRI, an HRI threshold may be determined. As described in detail above with regard to the method illustrated in FIG. 3, in one example a 3D lookup table stored in the PCM may be used to adjust the HRI threshold based on the level of fuel in the fuel tank and the ambient temperature. The HRI threshold may thus represent a value for which an executed EONV leak test is likely to provide robust results. For example, the HRI threshold may comprise an amount of air mass summation (lbs.) over a previous drive cycle, the air mass summation amount based on an indicated ambient temperature, and an indicated fuel level. As such, for a given ambient temperature (° F.), the HRI threshold may comprise a greater amount of air mass summation during a previous drive cycle for a fuel tank with a high fill level, and a lower amount of air mass summation for a fuel tank with a low fill level. In other examples, the HRI threshold may alternatively comprise a predetermined threshold, such as a number of miles driven, an amount of fuel injected summed over time, air mass summation over time, etc. Additionally or alternatively, any combination of engine load, fuel injected summed over time, air mass summation, miles driven, fuel level, ambient temp., etc., that may indicate an amount of heat rejected to the engine over time, may be utilized to determine the HRI threshold. Following determining the HRI and the HRI threshold, it may be indicated whether the HRI is greater than or equal to the HRI threshold. If the HRI is indicated to be less than the HRI threshold, active pressurization of the fuel system may be conducted prior to commencing the EONV test in order to increase pressure in the fuel system and evaporative emissions system. However, in this example, it may be understood that the HRI is indicated to be greater than or equal to the HRI threshold, and as such, the EONV test may commence without prior active pressurization of the fuel system and evaporative emissions system.

At time $t_3$, EONV entry conditions are met, the HRI is indicated to be above the indicated HRI threshold, and the fuel system may be understood to have stabilized. As such, at time $t_3$, the canister vent valve is commanded closed to seal the fuel system and evaporative emissions system from atmosphere, indicated by plot 515. Between time $t_3$ and $t_4$, pressure in the fuel system and evaporative emissions system rises, indicated by plot 510. As active pressurization of the fuel system and evaporative emissions system is not indicated, the three way ventilation valve remains in an off configuration, the cabin blower remains off, and the electric auxiliary pump remains off. As described above with regard to the method illustrated in FIG. 3, fuel tank pressure may be monitored until the pressure reaches the first threshold, represented by line 511. Alternatively, if the first threshold is not reached, pressure may be monitored until consecutive measurements are within a threshold amount of each other (e.g., pressure plateau), or until a pressure measurement is less than the previous pressure measurement.

At time $t_4$, pressure in the fuel system and evaporative emissions system is indicated to have plateaued. Accordingly, active pressurization of the fuel system and evaporative emissions system may be conducted according to the method illustrated in FIG. 3, responsive to an indication that the vehicle is not occupied and that entry conditions for active pressurization are met.

As such, at time $t_4$ it is indicated that the vehicle remains unoccupied. Furthermore, it may be understood that it is indicated that entry conditions are met for active pressurization of the fuel system and evaporative emissions system. For example, as described in detail above with regard to the method illustrated in FIG. 3, entry conditions may include indicating whether engine coolant temperature is above a threshold. The engine coolant threshold may comprise an engine coolant temperature that may enable the vehicle cabin to be heated to a predetermined temperature, in one example. The predetermined cabin temperature may comprise a temperature for which a predetermined amount of heat may be subsequently transferred from the vehicle cabin toward the fuel tank through the three way ventilation valve in the rear of the vehicle. In some examples, the engine coolant temperature threshold may additionally or alternatively be based on a difference between the first pressure threshold (e.g., line 511), and the indicated pressure achieved during the initial pressure rise portion of the EONV test (Pdiff). In still other examples, the threshold engine coolant temperature may additionally or alternatively be based on ambient temperature. Indicating whether entry conditions for active pressurization of the fuel system and evaporative emissions system are met may further include indicating whether all of the windows and doors in the vehicle are closed, to prevent heat from escaping the vehicle cabin to atmosphere via open windows and/or doors.

As such, at time $t_4$, with entry conditions for active pressurization of the fuel system and evaporative emissions system met, the electric auxiliary pump may be commanded on to circulate hot engine coolant to the heater core. The cabin blower may additionally be activated, in order to direct hot air emanating from the heater core to the vehicle cabin. Furthermore, the three way ventilation valve at the rear of the vehicle may be commanded to an on position, wherein the on position directs air from the vehicle cabin to the fuel tank, in order to heat the fuel tank and thus increase pressure in the fuel system and evaporative emissions system.

As described above with regard to the method illustrated in FIG. 3, the amount of heated cabin air routed to the fuel system may be based on a number of factors. For example, the amount of heated air routed to the fuel system may be based on the difference between the first pressure threshold and the indicated pressure achieved during the initial pressure rise portion of the EONV test. More specifically, it may be determined what amount of heat to route to the fuel system such that pressure in the fuel system and evaporative emissions system may increase to the first pressure threshold, under the condition that there are no undesired evaporative emissions in the fuel system and/or evaporative emissions system. The determined amount of heat may be further based on the level of fuel in the fuel tank, as the level of fuel in the tank may affect the amount of heat needed to achieve an expected pressure level. The determined amount of heat may be still further based on engine coolant temperature. In some examples, the determined amount of heat may be provided to the fuel system by activating the electric auxiliary pump, and blowers for a determined amount of time while maintaining open the three way ventilation valve. The determined amount of heat and determined amount of time may further be based on ambient temperature. In some examples, a temperature sensor in the fuel tank may be used to indicate fuel tank temperature, and heat may be provided until the temperature in the fuel tank reaches a predetermined temperature. Similarly, the predetermined temperature may be based on the difference between the first pressure threshold and the indicated pressure achieved during the initial pressure rise portion of the EONV test, and further based on fuel level, and ambient temperature.

Accordingly, at time $t_4$, with the electric auxiliary pump activated, the cabin blower activated, the three way ventilation valve at the rear of the vehicle commanded to an on position, and the canister vent maintained closed to maintain the fuel system and evaporative emissions system sealed, hot cabin air may be routed to the fuel tank to increase pressure in the fuel system and evaporative emissions system. Accordingly, pressure in the fuel system and evaporative emissions system begins to rise.

At time $t_5$, pressure in the fuel system and evaporative emissions system continues to rise. However, the electric auxiliary pump and the cabin blower are deactivated, and the three way ventilation valve is commanded closed. Accordingly, heat is no longer provided to the fuel tank. The deactivation of the electric auxiliary pump and the cabin blower, and closing of the three way ventilation valve at time $t_5$ may be based on the difference between the first pressure threshold and the pressure achieved prior to initiating active pressurization of the fuel system, as described above. As such, the electric auxiliary pump and cabin blower may be activated for a predetermined amount of time while routing hot cabin air to the fuel tank via the open three way ventilation valve. As described above, the predetermined amount of time may be further based on ambient temperature, fuel level, and engine coolant temperature. Some examples may further include monitoring fuel tank temperature, and stopping activation of the electric auxiliary pump and cabin blower, and closing the three way ventilation valve responsive to a predetermined fuel tank temperature. As described above, the predetermined fuel tank temperature may be based on the difference between the first pressure threshold and the pressure achieved prior to initiating active pressurization of the fuel system, and may further be based on fuel level and ambient temperature. In any of the above described examples, it may be understood that the amount of time that the electric auxiliary pump and cabin blowers are activated while maintaining open the three way ventilation valve comprises the routing of a determined amount of heat to increase the pressure in the fuel system and evaporative emissions system to the first pressure threshold, provided undesired evaporative emissions are not present.

Accordingly, between time $t_6$ and $t_7$, with the electric auxiliary pump, cabin blowers, and three way ventilation valve off, pressure in the fuel system and evaporative emissions system continues to rise, indicated by plot 510. At time $t_6$, pressure in the fuel system and evaporative emissions system reaches the first pressure threshold, indicating the absence of undesired evaporative emissions. As such, the canister vent valve may be commanded open, to relieve the pressure fuel system and evaporative emissions system. Accordingly, between time $t_6$ and $t_7$ pressure in the fuel system and evaporative emissions system returns to atmospheric pressure. Furthermore, as pressure in the fuel system and evaporative emissions system reached the first pressure threshold during the EONV test, the successful outcome may be recorded at the controller, and an evaporative emissions test schedule may be updated based on the passing result. At time $t_7$, the engine is again indicated to be activated, and accordingly, the engine cooling fans are turned on.

FIG. 6 shows an example timeline 600 for conducting an EONV test using active pressurization of the fuel system and evaporative emissions system, according to the methods described herein and with reference to FIGS. 3-4, and as applied to the systems described herein and with reference to FIGS. 1-2. Timeline 600 includes plot 605, indicating the on or off status of a vehicle engine, over time. Timeline 600 further includes plot 610, indicating pressure of a vehicle fuel system and evaporative emissions system, as monitored by a fuel tank pressure transducer (e.g., 120), over time. Line 611 represents a first threshold pressure level, wherein a pressure build in the fuel system and evaporative emissions system to the first threshold indicates an absence of undesired evaporative emissions. Line 612 represents a second threshold pressure level, wherein a vacuum build in the fuel system and evaporative emissions system to the second threshold indicates an absence of undesired evaporative emissions. Timeline 600 further includes plot 615, indicating an open or closed status of a canister vent valve (e.g., 114), over time. Timeline 600 further includes plot 620, indicating ambient temperature, over time. Line 621 represents a first threshold ambient temperature indicative of a temperature likely to result in a pressure build to the first threshold pressure level in the absence of undesired evaporative emissions. Line 622 represents a second threshold ambient temperature indicative of a temperature likely to result in a vacuum build to the second threshold pressure level in the absence of undesired evaporative emissions. Timeline 600 further includes plot 625, indicating whether the vehicle is occupied, over time. Timeline 600 further includes plot 630, indicating the on or off state of a three-way ventilation valve, over time. More specifically, an on state of the three way ventilation valve may refer to a position of the three way ventilation valve, wherein vehicle cabin air is routed to a position near a vehicle fuel tank, and an off state of the three way ventilation valve may refer to a position of the three way ventilation valve wherein vehicle cabin air is routed to atmosphere, away from the vehicle fuel tank. Timeline 600 further includes plot 635, indicating an on or off status of a blower configured to blow hot air emanating from a heater core of the vehicle to the vehicle cabin, over time. Timeline 600 further includes plot 640, indicating an on or off status of an electric auxiliary pump configured to circulate engine coolant through the cooling system during engine-off conditions, over time. Timeline 600 further includes plot 645, indicating the on or off status of engine cooling fans, over time. Timeline 600 further includes plot 650, indicating whether undesired evaporative emissions are indicated, over time.

With regard to timeline 600, may of the descriptions are common to the descriptions with regard to timeline 500. To avoid redundancy, such descriptions are simplified in timeline 600, but it should be understood that the same level of detail with regard to timeline 500 (and method 300) is applicable and relevant to timeline 600. As such, while common descriptions have been simplified in timeline 600 to avoid redundancy, the simplifications are in no way meant to be limiting.

At time $t_0$, the engine is on, indicated by plot 605. Accordingly, engine cooling fans are on, indicated by plot 645, and the canister vent valve is open, indicated by plot 615. Ambient temperature, indicated by plot 620, is between a first ambient temperature threshold, represented by line 621, and a second ambient temperature threshold, represented by line 622. The vehicle is occupied, indicated by plot 625. Cabin heat is not requested, and as such the blower configured to blow hot air emanating from a heater core is not on, indicated by plot 635. As the engine is on, electric auxiliary pump is off, as engine coolant is circulated via the engine-driven water pump, and the three way ventilation valve is off, thus diverting cabin air to atmosphere. Fuel system and evaporative emissions system pressure, as monitored by the fuel tank pressure transducer (FTPT) is near atmospheric pressure, as the canister vent valve is open. As described in FIG. 5, it may be understood that, if equipped, the fuel tank isolation valve is in an open conformation while the engine is operating, thus directing running loss fuel tank vapors to the fuel vapor canister. However, it should be understood that in some examples, particularly with regard to plug-in hybrid vehicles, the fuel tank isolation valve may be closed during engine-operation, thus sealing the fuel tank. In such an example, pressure in the fuel system as monitored by the FTPT may not be near atmospheric pressure. However, in this example, it may be understood that, if equipped, the fuel tank isolation valve is open. Finally, as the engine is in operation, an EONV test is not underway, and it may be understood that no prior EONV test diagnostics have indicated the presence of undesired evaporative emissions, indicated by plot 650.

At time $t_1$, the engine is turned off, and may be understood to comprise a key-off event. Accordingly, the engine cooling fans are turned off. As a vehicle-off event is indicated, it may be indicated whether entry conditions are met for an EONV test. In this example illustration, it may be assumed that entry conditions for an EONV test are indicated to be met. As such, the PCM may be maintained on, and the fuel system may be allowed to stabilize. At time $t_2$, it is indicated that the vehicle has become unoccupied. Between time $t_1$ and $t_3$, a heat rejection index (HRI) may be determined for the previous drive cycle. Following determining the HRI, an HRI threshold may be determined. The HRI threshold may thus represent a value for which an executed EONV leak test is likely to provide robust results. Following determining the HRI and the HRI threshold, it may be indicated whether the HRI is greater than or equal to the HRI threshold. If the HRI is indicated to be less than the HRI threshold, active pressurization of the fuel system may be conducted prior to commencing the EONV test in order to increase pressure in the fuel system and evaporative emissions system. However, in this example, it may be understood that the HRI is indicated to be greater than or equal to the HRI threshold, and as such, the EONV test may commence without prior active pressurization of the fuel system and evaporative emissions system.

At time $t_3$, EONV entry conditions are met, the HRI is indicated to be above the indicated HRI threshold, and the fuel system may be understood to have stabilized. As such, at time $t_3$, the canister vent valve is commanded closed to seal the fuel system and evaporative emissions system from atmosphere, indicated by plot 615. Between time $t_3$ and $t_4$, pressure in the fuel system and evaporative emissions system rises, indicated by plot 610. As active pressurization of the fuel system and evaporative emissions system is not indicated, the three way ventilation valve remains in an off configuration, the cabin blower remains off, and the electric auxiliary pump remains off.

At time $t_4$, pressure in the fuel system and evaporative emissions system is indicated to have plateaued. Accordingly, active pressurization of the fuel system and evaporative emissions system may be conducted according to the method illustrated in FIG. 3, responsive to an indication that the vehicle is not occupied and that entry conditions for active pressurization are met.

As such, at time $t_4$ it is indicated that the vehicle remains unoccupied. Furthermore, it may be understood that it is indicated that entry conditions are met for active pressurization of the fuel system and evaporative emissions system. As such, at time $t_4$, with entry conditions for active pressurization of the fuel system and evaporative emissions system met, the electric auxiliary pump may be commanded on to circulate hot engine coolant to the heater core. The cabin blower may additionally be activated, in order to direct hot air emanating from the heater core to the vehicle cabin. Furthermore, the three way ventilation valve at the rear of the vehicle may be commanded to an on position, wherein the on position directs air from the vehicle cabin to the fuel tank, in order to heat the fuel tank and thus increase pressure in the fuel system and evaporative emissions system.

As described above with regard to the method illustrated in FIG. 3, the amount of heated cabin air routed to the fuel system may be based on a number of factors. For example, the amount of heated air routed to the fuel system may be based on the difference between the first pressure threshold and the indicated pressure (Pdiff) achieved during the initial pressure rise portion of the EONV test. The determined amount of heat may be further based on the level of fuel in the fuel tank, as the level of fuel in the tank may affect the amount of heat needed to achieve an expected pressure level. The determined amount of heat may be still further based on engine coolant temperature. In some examples, the determined amount of heat may be provided to the fuel system for a determined amount of time. The determined amount of heat and determined amount of time may further be based on ambient temperature. In some examples, a temperature sensor in the fuel tank may be used to indicate fuel tank temperature, and heat may be provided until the temperature in the fuel tank reaches a predetermined temperature. The predetermined temperature may be based on the difference between the first pressure threshold and the indicated pressure (Pdiff) achieved during the initial pressure rise portion of the EONV test, and further based on fuel level, and ambient temperature.

Accordingly, at time $t_4$, with the electric auxiliary pump activated, the cabin blower activated, the three way ventilation valve at the rear of the vehicle commanded to an on position, and the canister vent maintained closed to maintain the fuel system and evaporative emissions system sealed, hot cabin air may be routed to the fuel tank to increase pressure in the fuel system and evaporative emissions system. Accordingly, pressure in the fuel system and evaporative emissions system begins to rise.

At time $t_5$, pressure in the fuel system and evaporative emissions system continues to rise. However, the electric auxiliary pump and the cabin blower are deactivated, and the three way ventilation valve is commanded closed. Accordingly, heat is no longer provided to the fuel tank.

Between time $t_5$ and $t_6$, pressure in the fuel system and evaporative emissions system reaches a plateau, without reaching the first pressure threshold. As such, a passing result from the pressure rise portion of EONV test is not indicated. Accordingly, at time $t_6$, the canister vent valve is commanded open to relieve pressure in the fuel system and evaporative emissions system. With the canister vent valve open, pressure in the fuel system and evaporative emissions system returns to atmospheric pressure between time $t_6$ and $t_7$. When the fuel tank pressure has stabilized, at time $t_7$, the canister vent valve is again closed, resealing the system in preparation for the vacuum portion of the EONV test. As the fuel tank cools, a vacuum may develop to a threshold vacuum level (second pressure threshold), in the absence of undesired evaporative emissions.

The ambient temperature, as shown by plot 620 is between the first and second temperature thresholds. As such, the cooling fans are activated, as shown by plot 645. The cooling effect of the fans encourages the fuel system and evaporative emissions system pressure to drop from $t_7$ to $t_8$ as a vacuum is generated. However, between time $t_7$ and $t_8$ the vacuum build does not reach the threshold vacuum level (second pressure level). It may be understood that, in this example, time $t_8$ represents the EONV test run time limit (e.g., 45 minutes), the run time limit based on vehicle battery charge. Accordingly, at time $t_8$, the canister vent valve is reopened, and the cooling fans are turned off. Furthermore, the presence of undesired evaporative emissions may be indicated at time $t_8$. As undesired evaporative emissions are indicated, scheduled evaporative emissions tests may be delayed, adjusted, or postponed until it is indicated that the source of undesired evaporative emissions has been mitigated. While timeline 600 is depicted as activating cooling fans responsive to the ambient temperature being between first and second temperature thresholds, it should be understood that in other examples, cooling fans may not be utilized to increase vacuum build in the fuel system and evaporative emission system, without departing from the scope of the present disclosure.

Between time $t_8$ and $t_9$, with the canister vent valve open, pressure in the fuel system and evaporative emissions system returns to atmospheric pressure. As the engine remains off, cooling fans remain off, and the vehicle remains unoccupied.

In this way, active pressurization of the fuel system and evaporative emissions system of a vehicle may be conducted by routing heated cabin air through the vehicle to the fuel tank in order to supplement an EONV test. Importantly, active pressurization of the fuel system and evaporative emissions system may be conducted during the course of the pressure rise portion of the EONV test, when it is indicated that the pressure increase has reached a plateau below a pressure threshold. In other examples, the active pressurization of the fuel system and evaporative emissions system may be conducted immediately, without first monitoring a pressure build in the absence of active pressurization, if it is indicated that the amount of heat rejected to the fuel system during a previous drive cycle is below a threshold.

The technical effect of actively pressurizing the fuel system and evaporative emissions system is to take advantage of the fact that engine coolant remains hot after engine-off conditions even in cool climates, and that this heat source may be used to actively pressurize the fuel system and evaporative emissions system to supplement EONV test procedures. By actively pressurizing the fuel system and evaporative emissions system, false failures of EONV test procedures due to environmental factors and vehicle operator drive habits may be reduced. Accordingly, unnecessary engine service may be avoided. The method may be ideal for autonomous driverless vehicles without occupants to sense heated air forced through the cabin after key off.

The systems described herein and with reference to FIGS. 1-2, along with the methods described herein and with reference to FIGS. 3-4, may enable one or more systems and one or more methods. In one example, a method comprises routing fuel vapors from a fuel tank to an evaporative emission system which is coupled to atmosphere, the fuel tank supplying fuel to an engine which propels a vehicle; and during an engine-off condition and responsive to predetermined test conditions, sealing the fuel tank and the emission system from atmosphere, and routing engine heat through a passenger cabin of the vehicle to the fuel tank. In a first example of the method, the method further includes wherein sealing the fuel tank and the emission system from atmosphere further comprises sealing the fuel tank and the emission system from the engine; wherein routing engine heat through a passenger cabin of the vehicle to the fuel tank comprises a pressure increase in the fuel tank and emission system below an expected threshold pressure level while the fuel tank and emission system are sealed; and wherein the pressure increase is monitored, or inferred. A second example of the method optionally includes the first example and further includes wherein inferring the pressure increase below the expected threshold pressure level is based on an amount and/or timing of heat rejected by the engine for an engine run time duration prior to the engine-off condition, the amount and/or timing of heat rejected by the engine below a threshold; and wherein monitoring the pressure increase below the expected threshold pressure level occurs while the fuel tank and emission system are sealed, and comprises indicating a pressure plateau during monitoring. A third example of the method optionally includes any one or more or each of the first and second examples and further includes wherein the expected threshold pressure level comprises a level of pressure in the fuel tank and emission system that indicates an absence of undesired evaporative emissions in the fuel tank and emission system, or a level of undesired evaporative emissions below a predetermined threshold level. A fourth example of the method optionally includes any one or more or each of the first through third examples and further includes wherein routing engine heat through the vehicle passenger cabin to the fuel tank in the fuel system increases pressure in the fuel tank and emission system; responsive to pressure in the fuel tank and emission system reaching the expected threshold pressure level subsequent to routing heated air to the fuel tank: unsealing the fuel tank and emission system from atmosphere and indicating the absence of undesired evaporative emissions or a level of undesired evaporative emissions below the predetermined threshold level; and responsive to pressure in the fuel tank and emission system not reaching the threshold pressure level subsequent to routing heated air to the fuel tank: unsealing the fuel tank and emission system from atmosphere; resealing the fuel tank and emission system responsive to an indication that pressure in the fuel tank and emission system has reached atmospheric pressure; monitoring a vacuum build in the fuel tank and emission system as the fuel tank cools; indicating an absence of undesired evaporative emissions or a level of undesired evaporative emissions below the predetermined threshold responsive to the vacuum build reaching a predetermined negative pressure threshold; and indicating the presence of undesired evaporative emissions or a level of undesired evaporative emissions above the predetermined threshold responsive to the vacuum build not reaching the predetermined negative pressure threshold. A fifth example of the method optionally includes any one or more or each of the first through fourth examples and further includes wherein routing engine heat through the passenger cabin of the vehicle to the fuel tank further comprises: routing a determined amount of heated air through the passenger cabin to the fuel tank. A sixth example of the method optionally includes any one or more or each of the first through fifth examples and further includes wherein the determined amount of heated air is based on one or more of the following: ambient temperature, engine coolant temperature, fuel level, and a pressure difference between the expected threshold pressure level and the pressure level comprising the monitored or inferred pressure increase below the expected threshold pressure level; wherein the determined amount of heated air comprises an amount of heated air to increase pressure in the fuel tank and emission system to the expected threshold pressure level. A seventh example of the method optionally includes any one or more or each of the first through sixth examples and further comprises increasing the determined amount of heated air responsive to a larger pressure difference, and decreasing the determined amount of heated air responsive to a smaller pressure difference; increasing the determined amount of heated air responsive to a lower ambient temperature, and decreasing the determined amount of heated air responsive to a higher ambient temperature; and increasing the determined amount of heated air responsive to a greater fuel level, and decreasing the determined amount of heated air responsive to a lower fuel level. An eighth example of the method optionally includes any one or more or each of the first through seventh examples and further includes wherein routing a determined amount of heated air through the passenger cabin to the fuel tank comprises the engine coolant temperature above a threshold coolant temperature; wherein the threshold engine coolant temperature is adjusted based on the determined amount of heated air to be routed through the vehicle passenger cabin to the fuel tank; and wherein the threshold coolant temperature is increased responsive to a greater determined amount of heated air, and decreased responsive to a lower determined amount of heated air. A ninth example of the method optionally includes any one or more or each of the first through eighth examples and further comprises circulating engine coolant to a heater core of the vehicle by activating an electric auxiliary pump; directing heated air to the passenger cabin by activating a cabin blower to direct heated air emanating from the heater core to the vehicle passenger cabin; fluidically coupling the passenger cabin to an air space in close proximity to the fuel tank via configuring a three-way ventilation valve in a first open conformation; wherein routing heated air through a passenger cabin to a fuel tank comprises activating the electric auxiliary pump to circulate engine coolant to the heater core, activating the cabin blower to direct hot air emanating from the heater core to the passenger cabin; wherein heated cabin air is routed to the fuel tank through the three-way ventilation valve configured in the first open conformation. A tenth example of the method optionally includes any one or more or each of the first through ninth examples and further comprises routing cabin air to atmosphere by configuring the three-way ventilation valve in a second open conformation, the second open conformation preventing routing cabin air to the fuel tank; and wherein routing cabin air to atmosphere is a default condition, and wherein routing cabin air to the fuel tank is only enabled responsive to the monitored or inferred pressure increase below an expected threshold pressure level. An eleventh example of the method optionally includes any one or more or each of the first through tenth examples and further comprises indicating a vehicle occupancy status; and wherein routing engine heat through a passenger cabin to the fuel tank comprises an indication that the vehicle is not occupied.

Another example of a method comprises routing fuel vapors from a fuel tank in a vehicle fuel system to an evaporative emissions system which is coupled to atmosphere, the fuel tank supplying fuel to an engine which propels a vehicle; and following a vehicle-off event; in a first condition, sealing the fuel system and evaporative emissions system of the vehicle and monitoring a pressure increase in the fuel system and evaporative emissions system; in a second condition, sealing the fuel system and evaporative emissions system, routing heated air through a vehicle passenger cabin to a fuel tank to increase pressure in the fuel system and evaporative emissions system, and monitoring a pressure increase in the fuel system and evaporative emission system; wherein a pressure increase above an expected pressure threshold in both the first condition and the second condition indicates an absence of undesired evaporative emissions. In a first example of the method, the method further comprises determining a heat rejection index, wherein the heat rejection index is based on an amount and/or timing of heat rejected by the engine for an engine run time duration prior to the vehicle-off event; wherein the first condition comprises the heat rejection index above a threshold; and wherein the second condition comprises the heat rejection index below the threshold. A second example of the method optionally includes the first example and further includes wherein during the first condition, responsive to the pressure increase in the fuel system and evaporative emissions system below the expected pressure threshold: maintaining the fuel system and evaporative emissions system sealed; routing heated air through a vehicle passenger cabin to a fuel tank to increase the pressure in the fuel system and evaporative emissions system; monitoring a second pressure increase in the fuel system and evaporative emission system; and indicating an absence of undesired evaporative emissions responsive to the second pressure increase above the expected pressure threshold. A third example of the method optionally includes any one or more or each of the first and second examples, and further comprises circulating hot engine coolant to a heater core of the vehicle by activating an electric auxiliary pump; directing heated air to the vehicle passenger cabin by activating a cabin blower to direct heated air emanating from the heater core to the vehicle passenger cabin; fluidically coupling the vehicle passenger cabin to an air space in close proximity to the fuel tank via configuring a three-way ventilation valve in a first open conformation; wherein routing heated air through a vehicle passenger cabin to a fuel tank comprises activating the electric auxiliary pump to circulate engine coolant to the heater core, activating the cabin blower to direct hot air emanating from the heater core to the vehicle passenger cabin; and wherein heated cabin air is routed to the fuel tank through the three-way ventilation valve configured in the first open conformation. A fourth example of the method optionally includes any one or more or each of the first through third examples and further includes wherein during the first condition and the second condition, responsive to pressure in the fuel system and evaporative emissions system not reaching the threshold pressure level after routing heated air through a vehicle passenger cabin to a fuel tank to increase pressure in the fuel system and evaporative emissions system: unsealing the fuel system and evaporative emissions system; resealing the fuel system and evaporative emissions system responsive to an indication that pressure in the fuel system and evaporative emissions system has reached atmospheric pressure; monitoring a vacuum build in the fuel system and evaporative emissions system as the fuel tank cools; and indicating an absence of undesired evaporative emissions responsive to the vacuum build reaching a predetermined negative pressure threshold, or the presence of undesired evaporative emissions responsive to the vacuum build not reaching the predetermined negative pressure threshold.

An example of a system for a vehicle powered by at least an internal combustion engine comprises: a fuel tank configured within a fuel system; a fuel vapor canister, configured within an evaporative emissions system, coupled to the fuel tank, further coupled to engine intake via a canister purge valve, and further coupled to atmosphere via a canister vent valve; a fuel tank pressure transducer; an electric auxiliary pump; a heater core; a cabin blower; a vehicle passenger cabin; a ventilation duct coupled to a three way ventilation valve, the three-way ventilation valve coupled to an air space surrounding the fuel tank in a first position, and coupled to atmosphere in a second position; a controller storing instructions in non-transitory memory, that when executed, cause the controller to: in a first condition, seal the fuel system and evaporative emissions system of the vehicle by commanding closed the canister vent valve and monitor a pressure increase in the fuel system and evaporative emissions system; in a second condition, seal the fuel system and evaporative emissions system by commanding closed the canister vent valve, route heated air through a vehicle passenger cabin to a fuel tank to increase pressure in the fuel system and evaporative emissions system, and monitor a pressure increase in the fuel system and evaporative emission system; wherein a pressure increase above an expected pressure threshold in both the first condition and the second condition indicates an absence of undesired evaporative emissions; wherein both the first condition and the second condition comprise an engine-off event; and wherein routing heated air through the vehicle passenger cabin to the fuel tank comprises activating the electric auxiliary pump to circulate engine coolant to the heater core, activating the cabin blower to direct hot air emanating from the heater core to the vehicle passenger cabin, and configuring the three-way ventilation valve configured in the first position such that heated air flows from the heater core to the fuel tank, via the vehicle passenger cabin. In a first example, the system further includes the first condition comprises an amount and/or timing of heat rejected by the engine during a previous drive cycle above a threshold; the second condition comprises an amount and/or timing of heat rejected by the engine during a previous drive cycle below the threshold; wherein the controller further stores instructions in non-transitory memory, that when executed, cause the controller to: during the first condition, responsive to the pressure increase in the fuel system and evaporative emissions system below the expected pressure threshold: maintain the fuel system and evaporative emissions system sealed; route heated air through the vehicle passenger cabin to the fuel tank to increase pressure in the fuel system and evaporative emissions system; monitor a second pressure increase in the fuel system and evaporative emission system; and indicate an absence of undesired evaporative emissions responsive to the second pressure increase above the expected pressure threshold. A second example of the system optionally includes the first example and further includes wherein the controller further stores instructions in non-transitory memory, that when executed, cause the controller to: during the first condition and the second condition, responsive to pressure in the fuel system and evaporative emissions system not reaching the expected pressure threshold: unseal the fuel system and evaporative emissions system; reseal the fuel system and evaporative emissions system responsive to an indication that pressure in the fuel system and evaporative emissions system has reached atmospheric pressure; monitor a vacuum build in the fuel system and evaporative emissions system as the fuel tank cools; and indicate an absence of undesired evaporative emissions responsive to the vacuum build reaching a predetermined negative pressure threshold, or the presence of undesired evaporative emissions responsive to the vacuum build not reaching the predetermined negative pressure threshold. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   routing fuel vapors from a fuel tank to an evaporative emission system which is coupled to atmosphere, the fuel tank supplying fuel to an engine which propels a vehicle; and
   during an engine-off condition and responsive to predetermined test conditions, sealing the fuel tank and the evaporative emission system from atmosphere, and routing engine heat through a passenger cabin of the vehicle to the fuel tank via a heater core to raise pressure in the fuel tank and the evaporative emission system.

2. The method of claim 1, wherein sealing the fuel tank and the evaporative emission system from atmosphere further comprises sealing the fuel tank and the evaporative emission system from the engine;
   wherein routing engine heat through the passenger cabin of the vehicle to the fuel tank comprises a pressure increase in the fuel tank and evaporative emission system below an expected threshold pressure level while the fuel tank and evaporative emission system are sealed; and
   wherein the pressure increase is monitored or inferred.

3. The method of claim 2, wherein inferring the pressure increase below the expected threshold pressure level is based on an amount and/or timing of heat rejected by the engine for an engine run time duration prior to the engine-off condition, the amount and/or timing of heat rejected by the engine below a threshold; and
   wherein monitoring the pressure increase below the expected threshold pressure level occurs while the fuel tank and evaporative emission system are sealed, and comprises indicating a pressure plateau during monitoring.

4. The method of claim 2, wherein the expected threshold pressure level comprises a level of pressure in the fuel tank and evaporative emission system that indicates an absence of undesired evaporative emissions in the fuel tank and evaporative emission system, or a level of undesired evaporative emissions below a predetermined threshold level.

5. The method of claim 4, further comprising:
   responsive to pressure in the fuel tank and evaporative emission system reaching the expected threshold pressure level subsequent to routing engine heat through the passenger cabin of the vehicle to the fuel tank, unsealing the fuel tank and evaporative emission system from atmosphere and indicating the absence of undesired evaporative emissions or the level of undesired evaporative emissions below the predetermined threshold level;
   responsive to pressure in the fuel tank and evaporative emission system not reaching the threshold pressure level subsequent to routing engine heat through the passenger cabin of the vehicle to the fuel tank, unsealing the fuel tank and evaporative emission system from atmosphere;
   resealing the fuel tank and evaporative emission system responsive to an indication that pressure in the fuel tank and evaporative emission system has reached atmospheric pressure;
   monitoring a vacuum build in the fuel tank and evaporative emission system as the fuel tank cools;

indicating the absence of undesired evaporative emissions or the level of undesired evaporative emissions below the predetermined threshold level responsive to the vacuum build reaching a predetermined negative pressure threshold; and indicating the presence of undesired evaporative emissions or the level of undesired evaporative emissions above the predetermined threshold level responsive to the vacuum build not reaching the predetermined negative pressure threshold.

6. The method of claim 2, wherein routing engine heat through the passenger cabin of the vehicle to the fuel tank further comprises:

routing a determined amount of heated air through the passenger cabin to the fuel tank.

7. The method of claim 6, wherein the determined amount of heated air is based on one or more of the following:

an ambient temperature, an engine coolant temperature, a fuel level, and a pressure difference between the expected threshold pressure level and a pressure level comprising the monitored or inferred pressure increase below the expected threshold pressure level; and wherein the determined amount of heated air comprises an amount of heated air to increase pressure in the fuel tank and evaporative emission system to the expected threshold pressure level.

8. The method of claim 7, further comprising:

increasing the determined amount of heated air responsive to a larger pressure difference between the expected threshold pressure level and the pressure level comprising the monitored or inferred pressure increase below the expected threshold pressure level, and decreasing the determined amount of heated air responsive to a smaller pressure difference between the expected threshold pressure level and the pressure level comprising the monitored or inferred pressure increase below the expected threshold pressure level;

increasing the determined amount of heated air responsive to a lower ambient temperature, and decreasing the determined amount of heated air responsive to a higher ambient temperature; and increasing the determined amount of heated air responsive to a greater fuel level, and decreasing the determined amount of heated air responsive to a lower fuel level.

9. The method of claim 7, wherein routing the determined amount of heated air through the passenger cabin to the fuel tank comprises the engine coolant temperature above a threshold engine coolant temperature;

wherein the threshold engine coolant temperature is adjusted based on the determined amount of heated air to be routed through the vehicle passenger cabin to the fuel tank; and wherein the threshold engine coolant temperature is increased responsive to a greater determined amount of heated air, and decreased responsive to a lower determined amount of heated air.

10. The method of claim 7, further comprising:

circulating engine coolant to the heater core of the vehicle by activating an electric auxiliary pump;

directing heated air to the passenger cabin by activating a cabin blower to direct heated air emanating from the heater core to the passenger cabin;

fluidically coupling the passenger cabin to an air space in close proximity to the fuel tank via configuring a three-way ventilation valve in a first open conformation;

wherein routing heated air through the passenger cabin to the fuel tank comprises activating the electric auxiliary pump to circulate engine coolant to the heater core, activating the cabin blower to direct heated air emanating from the heater core to the passenger cabin; and wherein heated cabin air is routed to the fuel tank through the three-way ventilation valve configured in the first open conformation.

11. The method of claim 10, further comprising:

routing cabin air to atmosphere by configuring the three-way ventilation valve in a second open conformation, the second open conformation preventing routing cabin air to the fuel tank; and wherein routing cabin air to atmosphere is a default condition, and wherein routing cabin air to the fuel tank is only enabled responsive to the monitored or inferred pressure increase below the expected threshold pressure level.

12. The method of claim 1, further comprising:

indicating a vehicle occupancy status;

wherein routing engine heat through the passenger cabin to the fuel tank comprises an indication that the vehicle is not occupied.

13. A method comprising:

routing fuel vapors from a fuel tank in a fuel system to an evaporative emission system which is coupled to atmosphere, the fuel tank supplying fuel to an engine which propels a vehicle; and following a vehicle-off event,
  in a first condition, sealing the fuel system and the evaporative emission system of the vehicle and monitoring pressure in the fuel system and the evaporative emission system;
  in a second condition, sealing the fuel system and the evaporative emission system, routing heated air via a heater core through a vehicle passenger cabin to the fuel tank to increase the pressure in the fuel system and the evaporative emission system, and monitoring the pressure in the fuel system and the evaporative emission system;

wherein a pressure increase above an expected pressure threshold in both the first condition and the second condition indicates an absence of undesired evaporative emissions.

14. The method of claim 13, further comprising determining a heat rejection index, wherein the heat rejection index is based on an amount and/or timing of heat rejected by the engine for an engine run time duration prior to the vehicle-off event;

wherein the first condition comprises the heat rejection index above a threshold; and wherein the second condition comprises the heat rejection index below the threshold.

15. The method of claim 13, wherein during the first condition, responsive to the pressure increase in the fuel system and the evaporative emission system below the expected pressure threshold:

maintaining the fuel system and the evaporative emission system sealed;

routing heated air via the heater core through the vehicle passenger cabin to the fuel tank to increase the pressure in the fuel system and the evaporative emission system;

monitoring a second pressure increase in the fuel system and the evaporative emission system; and indicating the absence of undesired evaporative emissions responsive to the second pressure increase above the expected pressure threshold.

16. The method of claim 13, further comprising:
circulating hot engine coolant to the heater core of the vehicle by activating an electric auxiliary pump;
directing heated air to the vehicle passenger cabin by activating a cabin blower to direct heated air emanating from the heater core to the vehicle passenger cabin; and
fluidically coupling the vehicle passenger cabin to an air space in close proximity to the fuel tank via configuring a three-way ventilation valve in a first open conformation;
wherein routing heated air through the vehicle passenger cabin to the fuel tank comprises activating the electric auxiliary pump to circulate hot engine coolant to the heater core, and activating the cabin blower to direct heated air emanating from the heater core to the vehicle passenger cabin; and
wherein heated cabin air is routed to the fuel tank through the three-way ventilation valve configured in the first open conformation.

17. The method of claim 15, wherein during the first condition and the second condition, responsive to the pressure in the fuel system and the evaporative emission system not reaching the expected pressure threshold after routing heated air through the vehicle passenger cabin to the fuel tank to increase the pressure in the fuel system and the evaporative emission system:
unsealing the fuel system and the evaporative emission system;
resealing the fuel system and the evaporative emission system responsive to an indication that the pressure in the fuel system and the evaporative emissions system has reached atmospheric pressure;
monitoring a vacuum build in the fuel system and the evaporative emission system as the fuel tank cools; and
indicating the absence of undesired evaporative emissions responsive to the vacuum build reaching a predetermined negative pressure threshold, or indicating a presence of undesired evaporative emissions responsive to the vacuum build not reaching the predetermined negative pressure threshold.

18. A system for a vehicle powered by at least an internal combustion engine comprising:
a fuel tank configured within a fuel system;
a fuel vapor canister, configured within an evaporative emission system, coupled to the fuel tank, further coupled to an engine intake via a canister purge valve, and further coupled to atmosphere via a canister vent valve;
a fuel tank pressure transducer;
an electric auxiliary pump;
a heater core;
a cabin blower;
a vehicle passenger cabin;
a ventilation duct coupled to a three-way ventilation valve, the three-way ventilation valve coupled to an air space surrounding the fuel tank in a first position, and coupled to atmosphere in a second position;
a controller storing instructions in non-transitory memory that, when executed, cause the controller to:
in a first condition, seal the fuel system and the evaporative emission system of the vehicle by commanding closed the canister vent valve and monitor pressure in the fuel system and the evaporative emission system; and
in a second condition, seal the fuel system and the evaporative emission system by commanding closed the canister vent valve, route heated air through the vehicle passenger cabin to the fuel tank to increase the pressure in the fuel system and the evaporative emissions system, and monitor the pressure in the fuel system and the evaporative emission system;
wherein a pressure increase above an expected pressure threshold in both the first condition and the second condition indicates an absence of undesired evaporative emissions;
wherein both the first condition and the second condition comprise an engine-off event; and
wherein routing heated air through the vehicle passenger cabin to the fuel tank comprises activating the electric auxiliary pump to circulate engine coolant to the heater core, activating the cabin blower to direct hot air emanating from the heater core to the vehicle passenger cabin, and configuring the three-way ventilation valve in the first position such that heated air flows from the heater core to the fuel tank, via the vehicle passenger cabin.

19. The system of claim 18, wherein:
the first condition comprises an amount and/or timing of heat rejected by the engine during a previous drive cycle above a threshold;
the second condition comprises an amount and/or timing of heat rejected by the engine during a previous drive cycle below the threshold; and
the controller further stores instructions in non-transitory memory that, when executed, cause the controller to:
during the first condition, responsive to the pressure in the fuel system and the evaporative emission system below the expected pressure threshold:
maintain the fuel system and the evaporative emission system sealed;
route heated air through the vehicle passenger cabin to the fuel tank to increase the pressure in the fuel system and the evaporative emission system;
monitor a second pressure in the fuel system and the evaporative emission system; and
indicate the absence of undesired evaporative emissions responsive to the second pressure above the expected pressure threshold.

20. The system of claim 19, wherein the controller further stores instructions in non-transitory memory that, when executed, cause the controller to:
during the first condition and the second condition, responsive to the pressure in the fuel system and the evaporative emission system not reaching the expected pressure threshold:
unseal the fuel system and the evaporative emission system;
reseal the fuel system and the evaporative emission system responsive to an indication that pressure in the fuel system and the evaporative emission system has reached atmospheric pressure;
monitor a vacuum build in the fuel system and the evaporative emission system as the fuel tank cools; and
indicate the absence of undesired evaporative emissions responsive to the vacuum build reaching a predetermined negative pressure threshold, or indicate the presence of undesired evaporative emissions responsive to the vacuum build not reaching the predetermined negative pressure threshold.

* * * * *